United States Patent [19]

Schroeder et al.

[11] Patent Number: 4,884,265
[45] Date of Patent: Nov. 28, 1989

[54] DIGITAL DEMODULATOR FOR FREQUENCY-DIVISION-MULTIPLEXED SIGNALS

[75] Inventors: Gene F. Schroeder; Guy T. Ellis, Jr., both of Sarasota, Fla.

[73] Assignee: Loral Corporation, Syosset, N.Y.

[21] Appl. No.: 44,424

[22] Filed: Apr. 30, 1987

[51] Int. Cl.[4] .............................................. H04J 1/02
[52] U.S. Cl. .................................................... 370/70
[58] Field of Search ...................... 370/50, 70, 20, 123; 375/82, 94; 360/28, 29, 30; 369/47, 48, 49

[56] References Cited

U.S. PATENT DOCUMENTS

| | | | |
|---|---|---|---|
| 3,956,623 | 5/1976 | Clark et al. | 375/82 |
| 4,253,186 | 2/1981 | Godard | 370/20 |
| 4,514,697 | 4/1985 | York | 375/82 |
| 4,603,300 | 7/1986 | Welles, II et al. | 329/50 |
| 4,620,160 | 10/1986 | Waggener | 329/104 |
| 4,768,187 | 8/1988 | Marshall | 370/123 |

OTHER PUBLICATIONS

Volder, "The Cordic Trigonometric Computing Technique," *IRE Trans. Electron. Computer,* Sep. 1959, vol. EC—8, pp. 330-334.
Schmid et al., "Use Decimal CORDIC for Generation of Many Transcendental Functions," *COMPUTER HARDWARE*, Edn Feb. 20, 1973, pp. 64–73.

*Primary Examiner*—Robert L. Griffin
*Assistant Examiner*—Wellington Chin
*Attorney, Agent, or Firm*—Saidman, Sterne, Kessler & Goldstein

[57] ABSTRACT

An improved digital demodulator capable of demodulating a frequency multiplexed input signal is disclosed. The frequency division multiplexed input signal is sampled in an analog-to-digital converter. The samples are translated by mixing with base band frequency signals to yield real and imaginary values corresponding to phase information in the original modulation signals. After translation, the translated samples are filtered in real and imaginary digital filters. After filtering, the original modulation information is recovered by analysis of the position of vectors in the complex plane represented by the real and imaginary values. In the preferred embodiment, a successive approximation technique is used to determine the angle of the vectors to the real axis. Low pass output filtering may be employed after recovery of the modulation signal for improvements in signal to noise ratio.

In the preferred embodiment, the translation is performed by multiplying the input samples by digital values corresponding to sine and cosine values of local oscillator signals at base band frequencies. Preselect filtering may be employed prior to translation to decimate the input samples where possible to reduce subsequent processing requirements.

In the preferred embodiment, the unit is operated in a first initialization mode in which a microprocessor supplies appropriate filter coefficients corresponding to the frequencies of the channels to be demodulated. Thereafter, the microprocessor does not directly control supply of samples or coefficients to the filters for evaluation. Very high data rates are thus made possible.

34 Claims, 13 Drawing Sheets

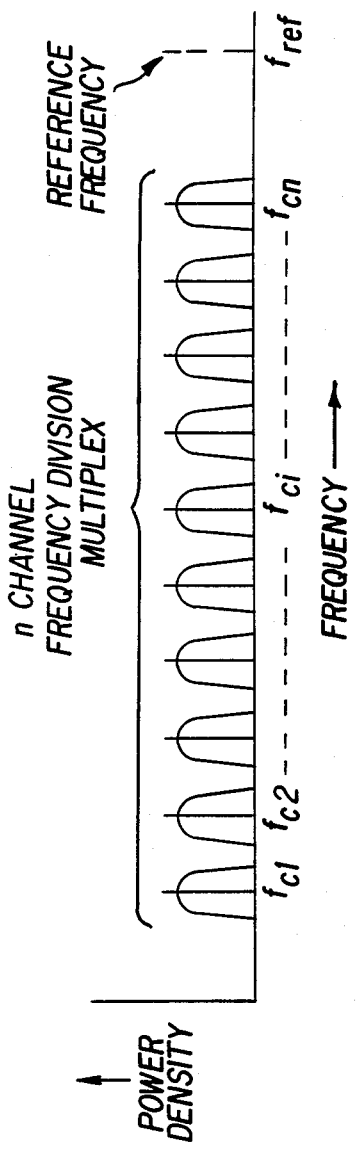
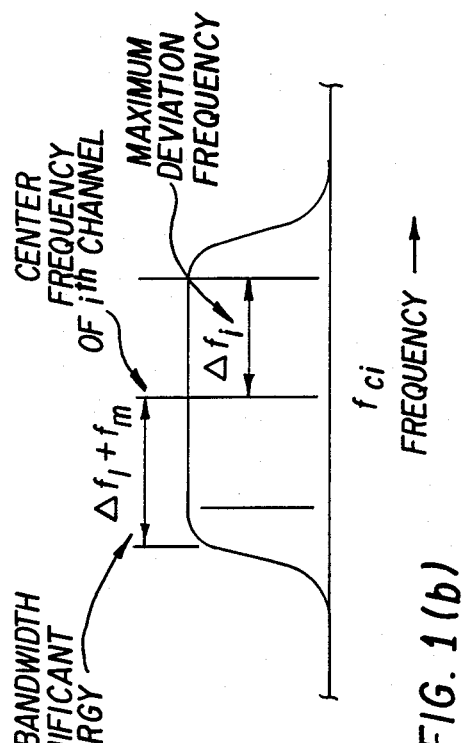

INPUT CIRCUIT

HIGH SPEED FILTER

HSF EVALUATION

1 CHANNEL INPUT SIGNAL

N-CHANNEL INPUT SIGNAL

TRANSLATOR

HIGH PRECISION FILTER
(HPF)

HPF

LPOF EVALUATION

LPOF

DETECTOR

DIGITAL DEMODULATOR FOR FREQUENCY-DIVISION-MULTIPLEXED SIGNALS

FIELD OF THE INVENTION

This invention relates to a digital demodulator for demodulating a frequency division multiplexed signal.

BACKGROUND OF THE INVENTION

There are many applications in which data signals are transmitted in a frequency division multiplexed manner, according to which different "channels" centered around different subcarrier frequencies are transmitted simultaneously. For example, this technique is used in telemetry applications for transmitting the various parameters connected with a missile in flight. The subcarrier frequencies commonly used for telemetry range between 400 Hz and 2.4 mHz with deviations (departures from the subcarrier frequency in accordance with the modulation signal) of plus or minus 1% to 40%. Accordingly, the highest frequency generally used for transmission of these signals is 2.4 mHz. This is consistent with the bandwidths of tape recorders used to record the telemetry signal for later demodulation and data processing.

The typical method of demodulating frequency division multiplexed signals is to provide a number of analog demodulators equal to the number of signals to be demodulated at a given time, each tuned to the center frequency of a single channel, and essentially demodulate each channel separately. The output signals, typically in the form of digital words representing the instantaneous amplitudes of the modulation signals, can then be processed simultaneously in a modern computer system. Such systems, involving a number of receiver circuits equal to the number of channels to be demodulated, tend to be relatively complex and costly, particularly when a large number of channels are to be simultaneously demodulated. Use of analog tuning elements in these circuits is also a source of continued complexity, particularly inasmuch as the circuits need to be tuned continually, are subject to drift over time, frequently introduce unavoidable distortion into the demodulation process, and require tuning when the subcarrier of a particular channel needs to be changed so that a different channel can be received.

It is known to use digital techniques for demodulating signals. Such techniques typically involve sampling the input signal at regular intervals to generate a series of digital words corresponding to the amplitude of the signal and mixing the signal with digital samples of sine and cosine signals of frequencies corresponding to the channel center frequency. The difference component comprises upper and lower side bands of the original subcarrier in quadrature. The quadrature components contain phase difference information corresponding to the original modulation signals. The original modulation signals can thus be retrieved by analysis of the phase information.

Typically the phase information can be treated as a vector in the complex plane. Prior techniques for measuring the angle of this vector and hence for recovering the phase information have involved use of look-up tables in which trigonometric values are stored. For example, U.S. Pat. No. 4,603,300 to Welles shows such a system, in which the tangent of the vector to one axis is calculated and the calculated value is then used to access a look-up table to determine the angle of the vector. However, in the event that the denominator of the tangent to be calculated is zero, this process involves division by zero with inappropriate results. Accordingly, it would be desirable to avoid this type of decoding process for measuring the angle of the vector to the real axis.

From time to time it is also desired that the input frequency division multiplexed signal be stored for later analysis. Typically, tape recorders are used to store the input signal. However, even the highly sophisticated tape recorders now in use are subject to some variation in running speed which can introduce distortion into a frequency modulated input signal. Accordingly, it would be desirable if means could be provided for ready compensation of any such distortion in the recorded signal.

Finally, it would be desirable to provide a frequency division multiplexed signal demodulator which can readily be reconfigured for operation with different channels at different subcarrier frequencies, which avoids use of analog circuit elements subject to drift, and which is readily controllable by an operator.

SUMMARY OF THE INVENTION

The present invention comprises a demodulator for a frequency division multiplexed input signal. The demodulator according to the invention samples the input signal at regular intervals generating digital samples. These samples are supplied to a translator which translates the subcarrier frequencies to the base band frequency, that is, removes the subcarrier information, by mixing the samples with digital samples corresponding to sine and cosine components of oscillator signals of frequencies corresponding to the center-channel frequencies of each channel. The resultant difference signals carry the phase information in the original modulation signals.

In the preferred embodiment, each difference signal takes the form of a series of values for real and imaginary components of vectors in the complex plane. After digital filtering corresponding to the channel deviation frequency, yielding a sequence of samples encoding the phase information in the original modulation signals, the phase modulation information is recovered by analysis of the positions of the vectors in the complex plane. In the preferred embodiment, this is done by a successive approximation technique employing the so-called Cordic algorithm. The original frequency modulation information can then be recovered by taking the derivative of the phase information as a function of time.

Compensation for variations in the playback speed of a storage device such as a tape recorder used to store the input signal can be provided by variation of the local oscillator frequencies which are mixed with the input signals in the translator. Conveniently, a reference signal derived from the local oscillator is recorded along with the input signal and is compared on playback to a known frequency standard. The result of the comparison can be used to derive a suitable compensation signal.

The number of channels of data which can be demodulated by the demodulator according to the invention at any particular time is a function of the carrier frequencies and bandwidths of the channels to be analyzed. If low frequency channels are to be demodulated a larger number of channels can be simultaneously handled.

This is a function of the ultimate throughput capability of the unit.

One possible approach to the design of such a unit would be to provide a microprocessor for controlling the multiplexing of the samples during the various filtering and translating processes. However, to do so would have required additional processing time and would have limited the net efficiency of the unit. Instead, a microprocessor is only used when the unit is first initialized, for example, upon selection of one or more channels to be demodulated by an operator. At that time appropriate filter coefficients and samples are stored in random access memory (RAM) coupled to the filters. Pointers used to address these random access memories are initialized. Thereafter, in a run mode the microprocessor is not directly involved and the pointers need simply be incremented to properly address the RAMs to provide appropriate coefficients and samples to the filters. In this way essentially no overhead is required for control of the filtering operations and very high data rates are achieved.

Another improvement comprises reduction of the input sample rate when the channels being demodulated are of relatively low frequencies. It is convenient to provide a fixed sampling rate, for example, nine mHz. However, suppose an input subcarrier channel of 1/50th the input bandwidth having plus or minus 5% variation applied by the modulation signal is to be demodulated. Clearly it is not necessary to sample this channel at a high rate. Accordingly, a decimation step may profitably be employed prior to the translation step to remove all unneeded samples from the sample stream, enabling more channels to be demodulated simultaneously. This is done according to the invention in a succession of digital filters, gradually reducing the bandwidth as much as possible. By the same token, as mentioned above, where higher frequency channels are to be demodulated fewer overall channels can be handled at a given sampling rate and processing rate. By providing the system of the invention with flexibility to adapt itself in this manner to the actual channels to be modulated, a unit of increased flexibility and utility is provided.

BRIEF DESCRIPTION OF THE DRAWINGS

The invention will be better understood if reference is made to the accompanying drawings, in which:

FIG. 1a shows the power density versus frequency of an N-channel frequency division multiplexed signal;

FIG. 1b shows details of the power density versus frequency of a single one of the channels of FIG. 1a;

DETAILED DESCRIPTION OF THE PREFERRED EMBODIMENT

SUMMARY

Figure 2:
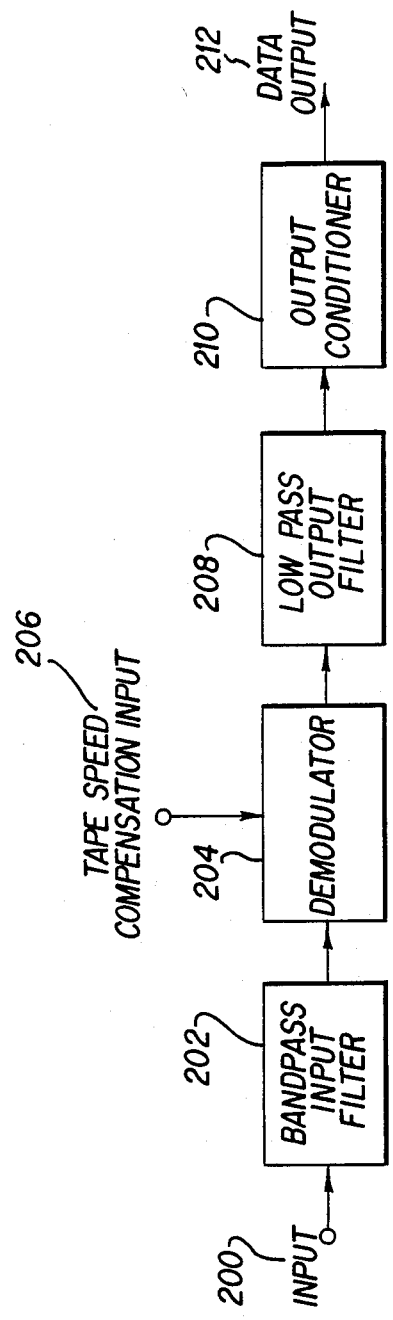
FIG. 2 shows a block diagram of the basic frequency modulation discriminator functions provided according to the invention.

As mentioned above, the present invention comprises a demodulator for a frequency division multiplexed input signal. The demodulator according to the invention samples the input signal at regular intervals, generating digital samples. These samples are supplied to a translator which translates the samples to the base band frequency, that is, removes the subcarrier information, by mixing the samples with digital samples corresponding to sine and cosine components of oscillator signals corresponding to the subcarrier frequencies. The resultant difference signals carry the phase information in the original modulation signal. In the preferred embodiment, the difference signals take the form of series of values for real and imaginary components of vectors in the complex plane. After digital filtering corresponding to the channel deviation frequency, yielding a sequence of samples encoding the phase information in the modulation signal, the phase information is recovered by analysis of the positions of the vectors in the complex plane. In the preferred embodiment, this is done by a successive approximation technique employing the so-called Cordic algorithm. The original frequency modulation information can then be recovered by taking the derivative of the phase information as a function of time.

Compensation for variations in the playback speed of a storage device such as a tape recorder used to store the input signal can be provided by variation of the local oscillator frequencies which are mixed with the input signals in the translator. Conveniently, a reference signal derived from the local oscillator is recorded along with the input signal and is compared on playback to a known frequency standard. The result of the comparison can be used to derive a suitable compensation signal.

The number of channels of data which can be demodulated by the demodulator according to the invention at any particular time is a function of the carrier frequencies and the bandwidths of the channels to be analyzed. If low frequency channels are to be demodulated a larger number of channels can be simultaneously handled. This is a function of the ultimate throughput capability of the unit.

One possible approach to the design of such a unit would be to provide a microprocessor for controlling the multiplexing of the samples during the various filtering and translating processes. However, to do so would have required additional processing time and would have limited the net efficiency of the unit. Instead, a microprocessor is only used when the unit is first initialized, for example, upon selection of one or more channels to be demodulated by an operator. At that time appropriate filter coefficients and samples are stored in random access memory (RAM) coupled to the filters. Pointers used to address these random access memories are initialized. Thereafter, in a run mode the microprocessor is not directly involved and the pointers need simply be incremented to properly address the RAMs to provide appropriate coefficients and samples to the filters. In this way essentially no overhead is required for control of the filtering operations and very high data rates are achieved.

Another improvement lies in the area of reduction of the input sample rate when the channels being demodulated are of relatively low frequencies. It is convenient to provide a fixed sampling rate, for example, nine mHz. However, suppose an input subcarrier channel of 1/50th the input bandwidth having plus or minus 5% variation applied by the modulation signal is to be demodulated. Clearly it is not necessary to sample this channel at such a high rate. Accordingly, a decimation step may profitably be employed prior to the translation step to remove all unneeded samples from the sample stream, enabling more channels to be demodulated simultaneously. This is done in a succession of digital filters, gradually decreasing the bandwidth of the signals being processed. By the same token, as mentioned above, where higher frequency channels are to be demodulated fewer overall channels can be handled at a given sampling rate and processing rate. By providing the system of the invention with flexibility to adapt itself in this manner to the actual channels to be modulated, a unit of increased flexibility and utility is provided.

FIG. 1a shows a plot of power density versus frequency of an N-channel frequency division multiplexed signal (or "multiplex"). As can be observed each of the channels is centered about a subcarrier frequency $f_{c1}$, $f_{c2}$ ... $f_{cn}$. A reference frequency $f_{ref}$ is also transmitted according to one aspect of the invention. Typical center frequencies for a 22-channel proportional bandwidth (PBW) multiplex range between 400 Hz and 240 kHz. However, the invention is not to be limited to these or any particular subcarrier frequencies.

FIG. 1b shows the power density versus frequency of one of the channels in the multiplex of FIG. 1a. As can be observed the power spectrum is centered about the center frequency $f_{ci}$ and the maximum deviation is plus or minus delta $f_i$. Half bandwidths of significant energy, delta $f_i$ plus $f_m$, the modulation frequency of the particular signal, are somewhat wider than the deviation frequency delta $f_i$.

According to the invention, the signal transmitted over each of the frequency division multiplexed channels of FIG. 1a may be any sort of frequency, amplitude or phase modulated information. Any sort of frequency, amplitude or phase modulated signal which can be impressed upon a subcarrier of appropriate frequency can be demodulated according to the invention.

FIG. 2 shows a block diagram of the system of the invention. The frequency-division multiplexed (FDM) signal is input at 200; this is the multiplex appearing in FIG. 1a Band pass input filtering 202 defines the upper and lower frequencies of the multiplex. The multiplex is supplied to a demodulator 204 which mixes the input signal with local oscillator signals of frequencies corresponding to each of the subcarriers of the input signal $f_{c1}$ through $f_{cn}$. At this point tape speed compensation input can be provided as indicated at 206. If the input signal has been stored on tape, some tape speed variation can be expected to occur on playback. Tape speed compensation can accordingly be made by variation of the local oscillator signals, such that the frequency modulation of the original input signal is recovered. The translated signals are then passed through a low pass output filter 208 in which the various frequency bands are separated out. The output signals from filter 208 are then demodulated at 210 and formatted in any desired fashion and output at 212.

Figure 3:
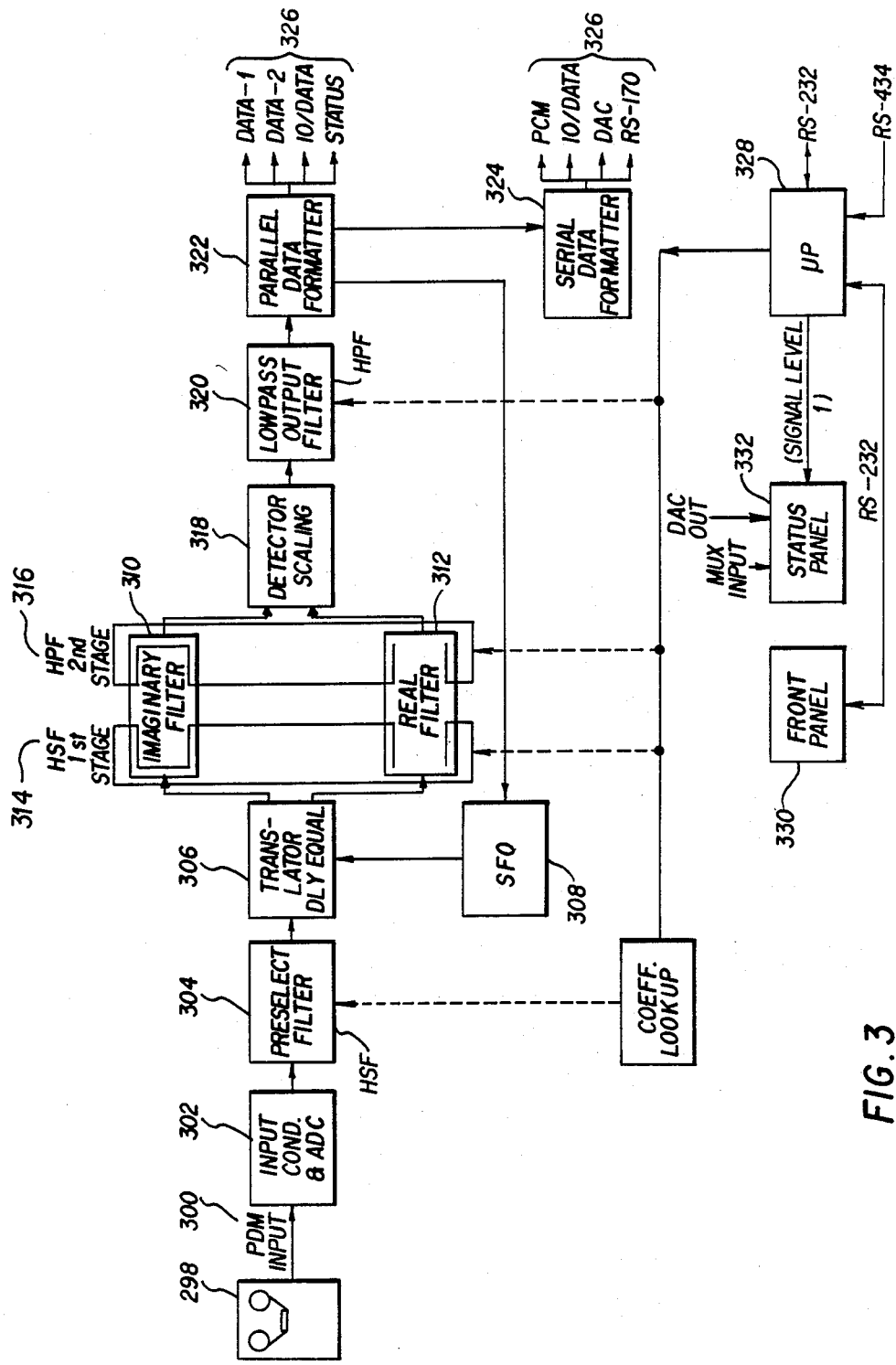
FIG. 3 shows a block diagram of the system of the invention including the main components thereof.

FIG. 3 shows a block diagram of the demodulator according to the invention in more detail. At 300 the FDM input signal is received. If desired, the input signal can be stored on a storage device such as a tape recorder 298 prior to demodulation. Input conditioning and analog digital conversion yielding a series of digital samples is provided at 302. It is convenient to sample at a fixed rate regardless of the frequencies of the multiplex. Therefore, a preselect filter 304 reduces the number of samples of the oversampled channels. That is, data at relatively low subcarrier frequencies has the number of samples taken reduced in order to reduce the processing power required subsequently. The samples are then supplied to a delay equalized translator 306, in which each of the input samples are mixed with each of the subcarrier frequencies of the multiplex; the difference signals generated in the mixing process contain the phase information in the original input modulation signals. A beat frequency oscillator 308 provides the functionality for tape speed compensation by proportional correction of the frequencies of the local oscillator signals it provides, which are mixed with the input signal in translator 306. The translated signals, which comprise imaginary and real components, are supplied to imaginary and real filters indicated at 310, 312; in the preferred embodiment, each of these comprises a first high speed filter stage 314 and a second high precision filter stage 316. The outputs of these filters are supplied to a detector block 318 in which the original modulation signal is recovered. Scaling may also be applied. The output is low-pass filtered through another filter 320 and supplied to parallel and serial data formatters 322, 324 to provide any desired output format as indicated generally at 326.

Control of the system is accomplished by microprocessor 328 which accepts operator input from a front panel 330 and provides operator readable outputs at a status panel 332. In a particularly preferred embodiment of the present invention, the microprocessor 328 is used in an initialization mode to set up the various filter coefficients of the filters 304, 306, 314, 316, 318, 320, corresponding to the channels to be demodulated at any given time, and to initialize various hardware pointers used to control data flow. The coefficients needed are stored in coefficient lookup tables 340, configured as ROM, and are supplied to RAMs associated with the various filters in the initialization mode. However, in this embodiment, microprocessor 328 is not used subsequently to control the flow of data through the system nor the supply of filter coefficients and samples from these RAMs to the various filters for processing. This yields substantially improved throughput as compared to a system in which a microprocessor, e.g. running a microcode program, were required to control the individual handling of each of the data samples and of the corresponding coefficients. The net result is that very high processing throughput is achieved.

In the preferred embodiment, two types of digital filters are used to provide all the filtering functions required. The first type is a high speed filter in which data essentially passes through the filter after a single iteration of the filtering process. The high speed filter, which is described in detail below, is used for the preselect filter 304 and for the first stage of the imaginary and real filters 314. The second type of filter is a high precision filter in which each data sample is processed through several iterations of filtering. The high precision filter is used for the second stage of the imaginary and real filters 316 and for the low pass output filter 320.

In the following, the functions of each of the significant portions of the demodulator shown in FIG. 3 will be described. Subsequently, a detailed description of the high speed and high precision filters will be provided, with indications of the differences between their implementations for their several uses where appropriate.

In general each of the filters employed is a Finite Impulse Response (FIR) digital filter, which is symmetrical for precise phase linearity. The coefficients of the filters are profitably calculated using the Remez algorithm and as mentioned are stored in a coefficient lookup ROM 340 (FIG. 3). When an operator selects the channels to be processed in an initialization mode, the microprocessor 328 sends the appropriate coefficients from lookup ROM 340 to RAMs associated with each of the filters. In the preferred embodiment, the operator may simply specify the channels by their center frequency, the frequency deviation, and the frequency modulation to be applied by the input signals. The microprocessor is equipped to interpolate between stored coefficients corresponding to particular defined channels if need be.

The following is a detailed description of one implementation of the demodulator of the invention. A table of contents is provided for convenience.

TABLE OF CONTENTS

I. INPUT CONDITIONING AND ANALOG-TO-DIGITAL CONVERSION
II. THE PRESELECT FILTER
III. THE HIGH SPEED FILTER (HSF)
  A. In General
  B. The High Speed Filter as First Stage Filter
  C. HSF Functions and Capabilities
  D. Operation
IV. THE TRANSLATOR
  A. In General
  B. Translator Functions and Capabilities
  C. Translator Operation
  D. Tape Speed Compensation
  E. Set Up of Translator
V. THE HIGH PRECISION FILTER (HPF)
  A. In General
  B. HPF Functions and Capabilities
VI. THE DETECTOR
VII. THE LOW PASS OUTPUT FILTER (LPOF)
  A. In General

I. INPUT CONDITIONING AND ANALOG TO DIGITAL CONVERSION

Figure 4:
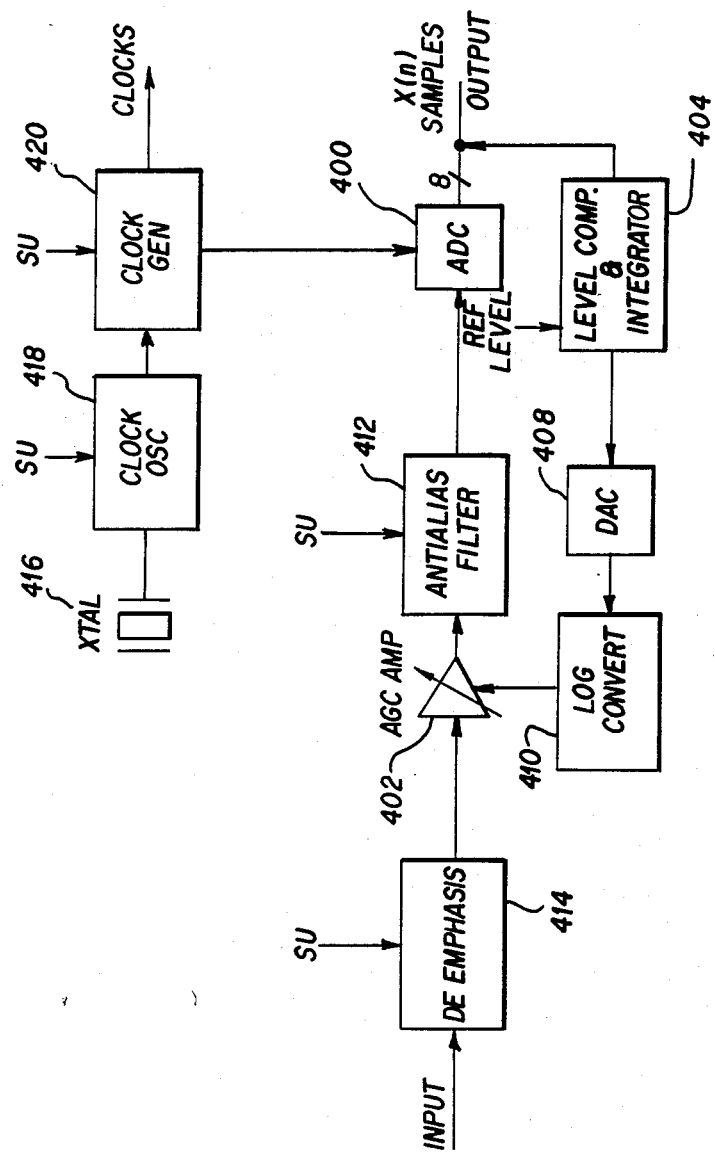
FIG. 4 shows a block diagram of the input circuit.

FIG. 4 shows in detail the functions provided in the input conditioning and analog-to-digital conversion block 302 of FIG. 3. As an initial step in the processing of the input signal, analog to digital conversion is performed in an analog to digital converter (ADC) 400. As is well understood, analog to digital converters are relatively expensive components; in particular their cost goes up as the number of bits of each digital sample output increases. Therefore, it is desirable that a relatively small, e.g., 8-bit, analog to digital converter be employed, and that the input signal be provided with automatic gain control such that the excursion of the incoming signal matches the dynamic range of the converter employed. Therefore, according to this aspect of the invention, an automatic gain control (AGC) amplifier 402 is employed to correct the level of the input signal for AGC purposes.

Figure 7A:
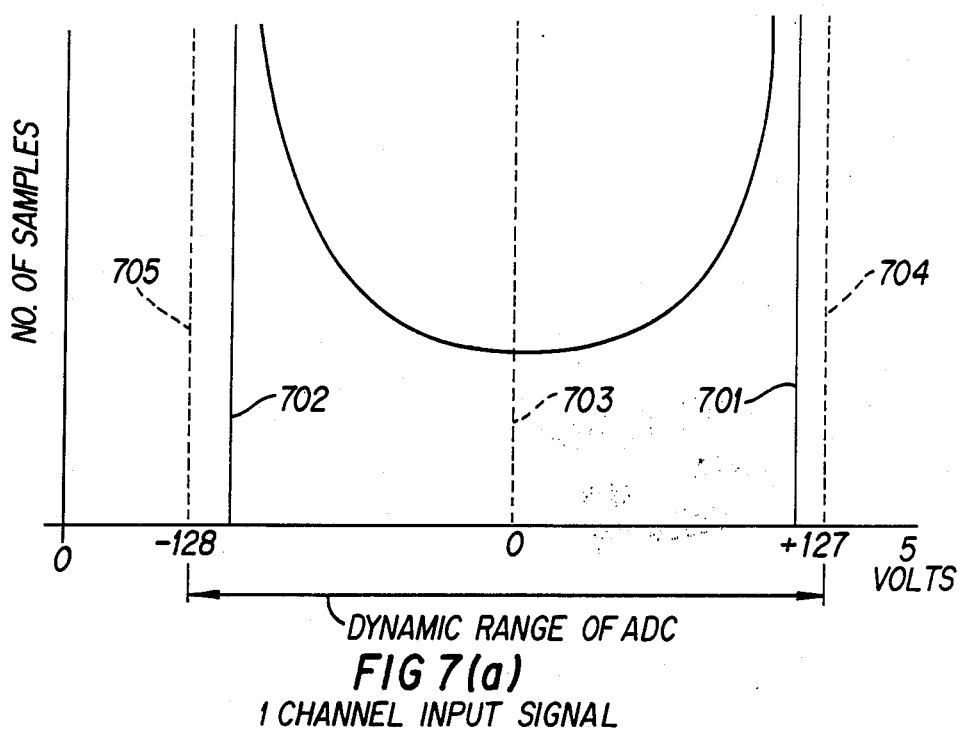
FIG. 7a shows the amplitude of a single-channel input signal versus the number of samples at each amplitude.

Those of skill in the art will recognize that the amplitude distribution of a single-channel input signal essentially approaches asymptotes centered about an average value. Therefore, it is a simple matter to set the gain applied by an AGC system somewhat outside these asymptotes, such that the maximum and minimum amplitudes of the single-channel input signal are conveniently accommodated by the analog to digital converter. FIG. 7a shows this graphically. This figure graphs typical sampled input amplitudes (depicted as voltage) versus the number of samples taken at each amplitude. For a generally sinusoidal input sample, the number of samples versus amplitude will approach upper and lower asymptomptic limits 701 and 702 respectively centered about an average amplitude 703. Therefore, it is a simple matter to set the gain applied in an automatic gain control system such that these values approach the upper and lower bounds 705 and 704 of the dynamic range of an analog to digital converter. For example, if the analog to digital converter used is an 8-bit unit, the upper bound 704 is set equal to 127 ($2^7 - 1$) and the lower bound 705 is set equal to is $-128$ ($-2^7$).

Figure 7B:
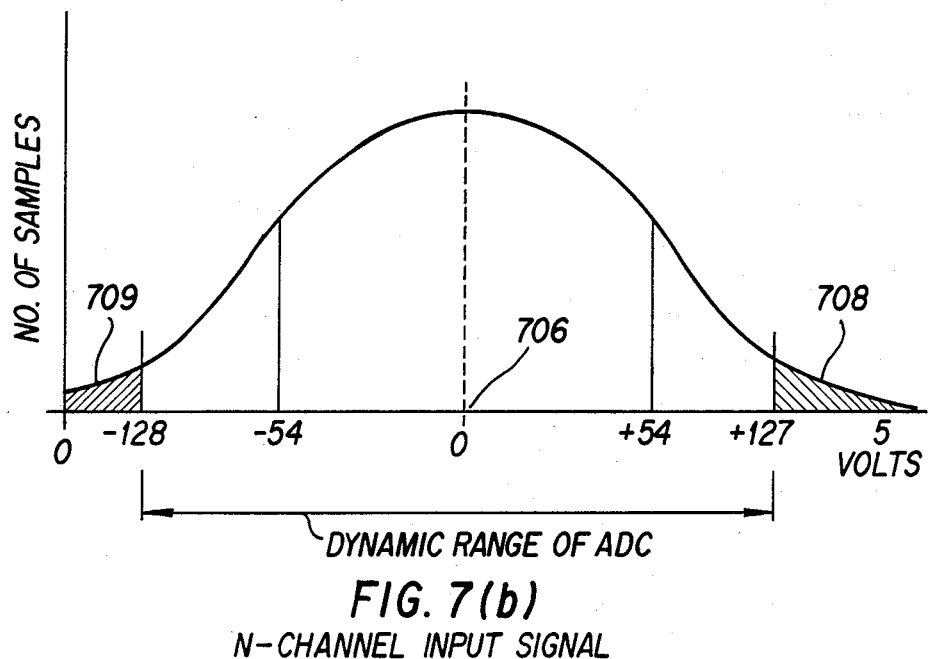
FIG. 7b shows the amplitude of a multiple-channel input signal versus the number of samples at each amplitude.

The inventors have found, however, that for a multiple channel, frequency division multiplexed input signal having five or more channels, the amplitude distribution of the input signal over time has an approximately Gaussian distribution. FIG. 7b is a diagram similar to 7a, showing the amplitude of the input signal versus the number of samples at each amplitude for an N-channel ($N \geq 5$) frequency division multiplexed input signal. As shown, while most of the input samples have amplitudes centered about a single amplitude value 706 which one would typically set near the center of the dynamic range of the analog to digital converter employed, "tails" of the amplitude range extend relatively far beyond this average amplitude. If one simply set the gain applied such that all sample amplitudes were accommodated within the dynamic range of the analog digital converter, the resolution provided by a typical analog-to-digital converter would be inadequate for the vast number of samples. According to the invention, the gain applied in the automatic gain control amplifier 402 is set such that some portions 708, 709 of the "tails" of the samples are cut off. Preferably, automatic gain control amplifier 402 is set such that 0.1% of the samples are out of the range of the analog to digital converter 400; the inventors find that adequate demodulation can be obtained at this figure.

This is implemented according to the invention in the following manner. The output samples are supplied to a level comparator and integrator 404 (FIG. 4). In the level comparator 404 they are compared to an arbitrary reference level to determine on a statistical basis the number of samples which exceed this arbitrary value. The integrator counts the number of times this occurs in some predetermined number of input samples. After this predetermined number of samples has been thus compared, a determination is made whether the number which exceed the reference is greater than a second arbitrary reference.

In a particularly preferred embodiment of the present invention, in which an 8-bit analog to digital converter 400 is used, the output value varies between −128 and +127. That is, each input sample is characterized as having a level between −128 and +127. The number of samples in a 1000-sample set exceeding the value ±54 is counted. If more than 160 of the 1000 samples exceed ±54, this means the gain is too high. That is, that too many of the samples (more than 0.1) are in the "tails" and hence are out of range of the analog to digital converter 400. The gain is proportionately reduced. This is accomplished by sending a signal to a digital to analog converter 408 which generates an analog signal supplied to the AGC amplifier 402 via a logarithmic converter 410. The logarithmic converter is employed so that the variation in gain applied by the AGC amplifier 402 is proportional to the different in dB between the desired and actual signals, not to the actual voltage level. For example, suppose the input sample can vary between 10 millivolts and 3 volts RMS. This is a net difference of 50 dB. However, the variations between 1.5 and 3 volts and 10 and 20 millivolts are each 20 dB. The logarithmic converter 410 provides a logarithmic change in the gain for departure of the samples from the predetermined limits.

Interposed between the automatic gain control amplifier 402 and the analog to digital converter 400 is an antialiasing filter 412. This simply provides a cutoff filter function on the input signals in accordance with the channels selected. For example, in a preferred embodiment, the demodulator according to the invention can accept frequencies up to 2.4 megahertz. Where the highest frequency of any of the channels actually selected is, for example, 900 kilohertz, it is desirable to limit the input pass band to this frequency simply to eliminate higher frequency noise. The anti-aliasing filter 412 is provided for this function. As indicated by the letters SU (for "set up"), the cutoff frequency of this filter is set in an initialization mode undergone when the unit is first set up by an operator.

As indicated, the anti-aliasing filter 412 is an analog filter which has some roll-off frequency. In order that the desired input is passed through filter 412 with no aliasing effects, the sampling rate employed in the analog to digital converter 400 is set at 3 times the highest frequency to be encountered in the particular multiplex selected for processing.

Completing the discussion of the input circuit found in FIG. 4, deemphasis is also typically provided at 414 as is conventional to compensate for preemphasis employed in transmission systems of this type. A crystal oscillator 416 provides a stable source of clocking frequency. This drives a clock oscillator 418 and a clock generator 420 which provide clocking signals for the entire demodulator according to the invention.

II. THE PRESELECT FILTER

The function of the preselect filter 304 is to extend the anti-aliasing filtering function to reduce system bandwidth where possible. That is, the preselect filter filters unnecessary high frequencies from low-frequency channels. The bandwidth is reduced by 2, 4, or 8, and the sampling rate may be reduced proportionately.

There is a two-fold advantage to preselect filtering. First, the reduced sample rate allows reduced processing requirements in the translator, and in s stages of filtering. Secondly, the phase delta phi value of the center channel frequency, used to recover the input modulation signal, may be more accurately represented.

As mentioned, a first improvement provided by the preselect filter is reduction in the sample rate. A proportional increase in delta phi values must be made for corresponding channels. That is, as the sample rate is reduced, the interval between samples increases proportionally. Delta phi (the value of the center channel frequency with which the signal is mixed in the translator) must be accordingly increased. The value of delta phi loaded for "preselect 1" sample stream channels (channels decimated in one stage) into the translator is 2, 4, or 8 × delta phi of the non-decimated sample stream, and 4, 16, or 64 × delta phi for the more highly decimated "preselect" 2 channels. A proportional improvement is thus made in center frequency tracking accuracy.

The second advantage of preselect filtering is that the reduced sample rates require reduced processing in the translator, and in the downstream filter cards. This is also instrumental in implementing the time division multiplexing processing technique employed throughout the demodulator of the invention. More particularly, two levels of multiplexing are employed in the digital discriminator of the invention. All channels are processed by the same physical hardware, one channel at a time. This is "hardware" multiplexing in which the time continuum is broken into segments and the hardware performs the filter evaluation functions in a channel sequence. The power of the demodulator architecture according to the invention is that many narrow bandwidth channels may be allocated incremental amounts of processing power via multiplexing, or the processing power may be concentrated entirely on a single higher-frequency channel with significantly increased processing requirements. This allows ready reconfiguration of the unit for demodulation of widely varying selections of channels.

The second level of multiplexing is time slot multiplexing, in which multiple channels share a common time slot. This can be implemented when the following conditions are met:

1. All channels sharing a common time slot require the same processing time per filter, and channels that are preselect filtered at a given rate are multiplexed together.
2. The same sequence of filters must be applied to all channels in a common time slot.

Two channels that are preselect filtered at 2:1 may share a common time slot by simply alternating their utilization. Preselect-2 channels, that is, those that have been decimated by a total factor of 4:1 from the original sample rates, may have 4 channels share a time slot, again by alternating utilization.

The following example of a channel sequence shows both hardware multiplexing and time slot multiplexing. The expanded control sequence is:

| T.S. | (A) | (B) | (C) | (D) |
|------|-----|-----|-----|-----|
| 1  | 22 | 22 | 22 | 22 |
| 2  | 21 | 21 | 21 | 21 |
| 3  | 20 | 20 | 20 | 20 |
| 4  | 19 | 19 | 19 | 19 |
| 5  | 18 | 18 | 18 | 18 |
| 6  | 17 | 17 | 17· | 17 |
| 7  | 16 | 15 | 16 | 15 |
| 8  | 14 | 13 | 14 | 13 |
| 9  | 12 | 11 | 12 | 11 |
| 10 | 10 | 9  | 10 | 9  |
| 11 | 8  | 7  | 6  | 5  |
| 12 | 4  | 3  | 2  | 1  |

The translator and first stage control sequence (2K CBU) example) allows 12 time slots (T.S.), each of which is subdivided into four parts A-D. 1:1 sample rate channels (no decimation) require a unique time slot. Thus, time slots 1-6 show a single channel number. Time slots 7-10 each show two channels multiplexed 2:1. Finally, data channels 8-1 require only one fourth the processing power and therefore are multiplexed 4:1 into time slots 11-12.

Thus, the advantages of preselect filtering are:
1. More accurate delta phi representation for low rate channels.
2. Allows time slot multiplexing in the translator and first stage, for more efficient use of the digital discriminator processing power.

Preselect filtering is implemented using one High Speed Filter (HSF). The HSF circuitry is detailed below. The control circuitry residing on the translator performs the interface functions of sample pairing, circular address generation, that is, after initialization by the microprocessor, channel I.D. generation, decode of the preselect output channel I.D., and generation of output timing.

More specifically, the control sequence is repetitive by nature; the four columns of the sequence repeat ad infinitum. According to an important aspect of the design of the demodulator of the invention, this repetition is taken advantage of by using first-in first-out buffers (FIFOs) as repetitive circular control store elements. As is explained in detail below, this control arrangement allows a substantial improvement in throughput as compared, for example, to one in which a microprocessor generates individual store addresses.

Thus, the control sequence of the preselect filter is executed in a circular fashion. That is, the coefficients of the digital filters are stored in RAM which is accessed by a "circular pointer", one in which the addresses are incremented and ultimately repeated.

The characteristics of the filters are established by their coefficients, which are loaded under microprocessor control upon selection of the channels in a particular multiplex by the operator in an initiation mode. Different length filters (filters of differing numbers of processing steps, or "taps," in which the input samples are multiplied by coefficients chosen according to the desired filtering function) may be used depending on the individual multiplex parameters.

As mentioned above, the preselect filter 304 is implemented as a high speed filter (HSF). The identical circuit is used as the first stage filter 314 of the imaginary and real filters 310 and 312.

The following describes the high speed filters generically and is followed with a detailed description of their implementation as used in the first stage of the real and imaginary filters 310 and 312. In this embodiment, the high speed filter receives data and tag information from the translator 306 which is discussed subsequently. As mentioned, the function of the circuit is identical when it is employed as the preselect filter 304, the functions of which were just described.

III THE HIGH SPEED FILTER (HSF)

A. In General

Three High Speed Filter (HSF) cards are used on the digital demodulator according to the invention. One is used for the preselect filter 304, and one each for the first stage 314 of the real and imaginary filters 310, 312. Each HSF card evaluates a sequence of channel filters based on an N sample clock sync period. The filter evaluation result is output along with a storage address or "tag" to the following stage of processing.

In order to meet the performance requirements of the digital demodulator of the invention, HSF memory bandwidth utilization is reduced by storing two successive samples at a time. This reduces the memory bandwidth used for storing data by $\frac{1}{2}$. Two time-sequential samples, designated even and odd, are stored at a time. They are maintained in separate buffers. The filter evaluations are always done to effect a constant 32-tap delay. This establishes the total effective circular buffer space as 128 words per channel.

The correct sequence of control words is loaded into a control FIFO by the microprocessor during an initialization mode. These words determine the sequence of filters that are to be evaluated. As each word is sent to the evaluation logic, the corresponding store address field is incremented by an amount (1, 2, 4, 8, 16, 32, 64) as required to maintain consecutive store address values, and that word is placed back into the FIFO. These store addresses in turn create a circular buffer corresponding to each channel as the data is stored in the following buffer memory.

The number of occurrences of samples from a particular channel ID in the control store sequence is proportional to the net sample rate of the input sample stream. The expanded control store sequence contains one occurrence of each of the lowest sample rate channel. Channels that use a higher rate input stream occur in the sequence multiple times proportional to the increased rate. For example, the $7\frac{1}{2}\%$ typical deviation proportional band width (PBW) multiplex uses 8:1 and 64:1 preselection. The 64:1 preselect channels occur once in the control sequence, and the store address is incremented by 1. The 8:1 preselect channels occur 8 times in the control sequence. They are initialized to addresses (0-7) and each incremented by 8. The no-preselect channels (that is, those which are not decimated but are sampled at the full rate) occur 64 times in the sequence. These are initialized to address (0-63), and are not incremented.

The control sequence in the FIFO consists, in part, of storage addresses (i.e., RAM address pointers) for the next stage of filtering. A PROM look-up table identifies, based on decimation ratio and output storage address, the buffered data samples to be used in the evaluation. An evaluation pointer is passed to the evaluation circuit, and provides a reference point in the HSF buffer memory. Based on this pointer, the evaluation circuit generates the correct memory addresses and timing signals to accomplish the filter evaluation. The results of the filter computation and the output store address are passed to the following filter stage.

B. The High Speed Filter as First Stage Filter

The first stage filter performs a complex filtering function on data output by the Translator. The first stage filter uses two High Speed Filter (HSF) cards. The two cards are designated Real (Re) and Imaginary (Im). At all times the two filter cards execute the identical set of filter evaluations. They are initialized in the initialization mode at the same time. The Im filter card is set to "listen" to all the Re setup values including coefficient and control information. Using the listen capability, both cards are setup identically. The individual control circuits operate in an entirely synchronous manner, providing lock step filter evaluation, further simplifying control.

As mentioned, the first stage filter cards receive data from the Translator card. Pairs of Re and of Im samples are passed to their respective HSF first stage filter cards in a 9 mHz clock synchronous transfer. ("Pairs of samples" refers to two successive samples in time.) Pairs of samples are transferred to reduce the memory bandwidth required for storing information. The difference between the Re and Im samples is that the Re sample pairs have been translated (multiplied) by $\cos(W_c t)$, where t is the time at which the sample was acquired, while the Im samples were translated by $\sin(W_{ct})$. $W_c$ is the center frequency (in radians) of the channel for which the samples were translated. Note that each sample pair must be translated uniquely for each channel.

The control circuitry in the translator maintains a unique circular buffer of sequential translated samples, corresponding to each channel, in the buffer memory of the first stage filter cards. These buffers are maintained in a synchronous manner with respect to the sample clock. Two samples are received, and are translated and stored in the first stage filter buffer memory corresponding to each channel. The translator then "waits" for the next sample pair.

The first stage filter control also operates synchronously, on an N sample period, where N is at least 2. The value N is the decimation rate which is the largest decimation of any sample rate channel. Channels at smaller binary multiples (N divided by 2, N divided by 4, N divided by 8) are also supported.

As an example, the common decimation rate of the first stage filter is 16 for the typical 2 kHz constant bandwidth (2KCBW) multiplex. In this case some channels are decimated 8:1 in the first stage, and some channels 16:1. N is therefore 16. At the synchronization point the first stage controller evaluates a succession of filters corresponding to the individual channels. The also common 7.5% PBW multiplex has a common decimation of 12:1; therefore N=12 in this case. As noted, the first stage decimation ratio may be 16:1 in one case and 12:1 in another. These parameters are selected in accordance with achieving the goal of providing the greatest decimation possible in the first stage. This in turn offloads the downstream filter cards since their processing rates are reduced proportionately. The ultimate throughput restriction is the HSF processing power. In the preferred embodiment, this is 36 MTaps/sec, each Re and Im.

The output of the first stage filter is Re and Im data stored in buffer memory of the second stage filter (that is, the high precision filter 316, which is discussed in detail below). These are 64 word circular buffers comprised of successive samples output from the two HSFs. The HSF pointer is incremented with each set of Re and Im samples. This output store address functionally creates the circular buffer.

The two HSFs operate on the identical channel sequence, i.e., the tags by the Translator are employed by the HSF. Both HSF control store sequencers are loaded the same time. Translation is synchronized to the sample rate, operating on pairs of samples as they become available. The HSF is also slaved to the sample rate clock, operating on new samples when the new samples become available. The Translator is synchronized to two sample periods, the HSF to N sample periods.

Tags, i.e., channel identifiers, for the subsequent stages (CPXF and LPOF) are similarly generated by the HSF. These signals are used by the second stage and LPOF control sequencers to generate their filter evaluation sequences.

Architectural features of the HSF circuit design of interest include:
1. Use of an internal control sequencer, synchronized at discrete intervals of time. This time interval is equal to an integer number of samples.
2. Zero real-time overhead for control, which allows full utilization of the 36 MTAP/sec (per card) processing power.
3. Use of interleaved buffer RAM, which provides dedicated time slots for storing and retrieving data This again provides zero overhead operation.
4. Individual channel buffers for 128 successive samples.
5. Single iteration FIR filter implementation of 12 to 64 taps in length, the length of which is programmable on an individual-channel basis (N×4 taps/channel).

The HSF performs a single iteration of filtering on the channel sequence generated by the internal controller. The processing rate of 36 MTAPs/sec is achieved by the zero-overhead control function. Hence, the current filter evaluation may proceed without interruption. The filter type used in all stages of the digital discriminator of the invention is a symmetrical linear-phase Finite Impulse Response (FIR) filter which is a maximum of 64 taps in length. The coefficients corresponding to each filter (1 per channel) must be loaded into the HSF coefficient RAMs by the microprocessor during the initialization mode. The coefficients (which can conveniently be calculated using the Remez exchange algorithm) are stored in ROM as part of manufacture of the demodulator according to the invention.

The primary function of the first stage filter is sample rate reduction. Based on Nyquist's Theorem, the sample rate may only be reduced if the bandwidth of the signal being represented is reduced proportionately. At the translator, the entire multiplex bandwidth must be supported. Once the individual channels have been translated to base band, the associated maximum deviation frequency, and first side band, establish the band of interest. A proportional reduction in sample rate is desirable, but not achievable in a single iteration. This leads to the multi-stage, multi-decimation approach using multiple filters for processing efficiency which is employed according to the invention. It is desirable to achieve the largest decimation possible in the first stage within the processing power limitations of the stage.

C. High Speed Filter Functions and Capabilities

1. The High Speed Filter (HSF) provides buffering capability to accept high rate data from a preceding card. Sustained rates of 18 mwords/sec, in paired word transfers, may be obtained.
2. The architecture of the HSF provides auto-interleaved memory access. As a result sustained input rates are transparent to the evaluation function.
3. The HSF is capable of evaluating any sequence of filters at an effective rate of 36 Mtaps/sec. The FIR filter evaluations are restricted to integer multiples of four taps in length, and they must be symmetrical.
4. The HSF operates on the buffered data in a synchronous manner based on a 9 MHz processing clock. The sequence in which filters are evaluated is determined by the initialization of the control sequencer. This is provided in an initialization mode in which a microprocessor initializes the appropriate pointers. The microprocessor does not thereafter control operation of the HSF card.
5. The two operations of read and store proceed independently, but are synchronized at discrete time intervals. This interval of synchronization is generally the first stage decimation rate.
6. The resulting output of the HSF provides a store address and data value. The effect is to create a circular data buffer in the following stage buffer memory.
7. An additional output is provided which buffers the control sequence of channels to other card controllers. This sequence corresponds to the channels which are about to be evaluated. This information is used by down stream functions to indicate which channels are being evaluated at any given point in time.
8. The HSF implements a single stage of filtering on the channel sequence. The supported decimation rates are 2, 4, 8, 16, 3, 6, or 12:1.
9. Signature generation capability (that is, the processing of a predetermined stored data stream, to verify filter operation) is provided at the output of the HSF card.

D. Operation

Each HSF card 500 (FIG. 5) is driven by its own internal channel sequence. A FIFO 502 contains the sequence. As each channel is evaluated, its store address field is updated in a arithmetic logic unit (ALU) 503 and the control word placed back into the FIFO 502. This maintains the correct order indefinitely. Synchronization of the channel sequence is accomplished on an N-sample basis. The controller performs all the indicated evaluations, then "waits" the remainder of the N sample time period. N is typically 2 to 16.

The control circuitry included by sequence generator 504 comprising FIFO 502 passes evaluation pointers to the evaluation address generator 506 circuitry. An evaluate pointer stored in PROM 510 is associated with each output store address. The evaluate pointer provides a reference pointer to the sample RAM buffer memory 514 for filter evaluation. Coefficients are similarly supplied from a coefficient RAM 516. Based on the pointers, the evaluation address generator 506 generates the address sequence and timing signals needed by filter 508 to perform each evaluation. The result of the computation is then output at 520 to the next filter stage along with the output store address 540 and a clock signal 542.

Figure 8:
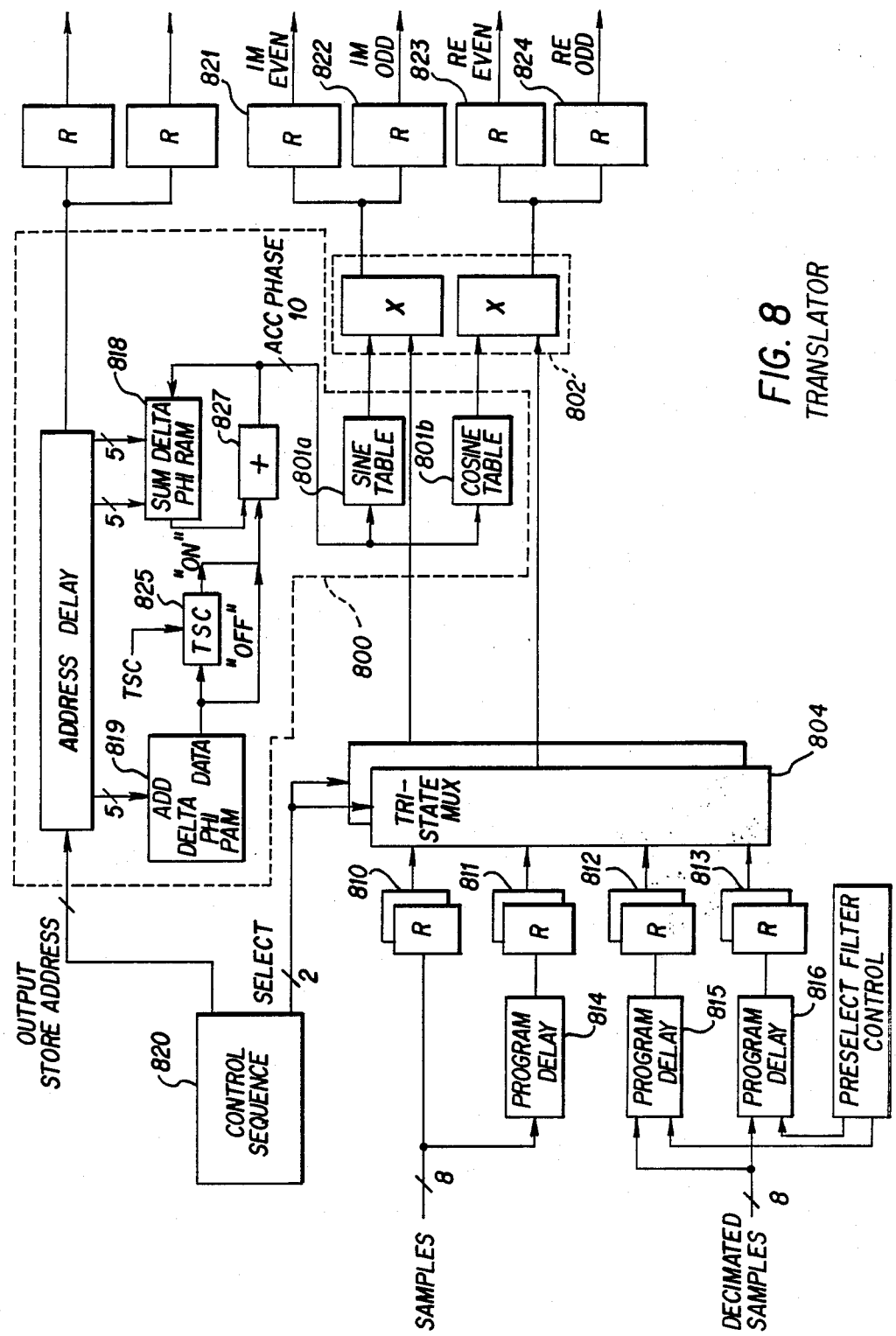
FIG. 8 shows a block diagram of the translator card, indicating the data flow therein.

The coefficients are loaded to the coefficient RAM 516 by microprocessor 328 upon initialization of the unit, while the samples are supplied to their RAM 514 from the translator card discussed below in connection with FIG. 8.

In essence, the digital filter 508 operates at a rate of 18 mHz, processing 4 samples per clock for a total evaluation rate of 36 mtaps (filter evaluations) per second. Multiplexer 518 supplies 4 pointers from an evaluation address generator 506 during the first half of the 9 megahertz cycle, and stores data, that is, samples received from the translator, in the second half of the cycle.

More specifically, the HSF card performs memory access based on a 9 MHz clock rate. During one-half of the cycle, any data provided by the preceding card is stored into the associated address. During the other one-half clock period, the evaluation circuitry may access the memories to supply the required data to filtering circuit. In this fashion evaluations proceed uninterrupted by store cycles. This is controlled by the memory address multiplexer 518.

Figure 6:
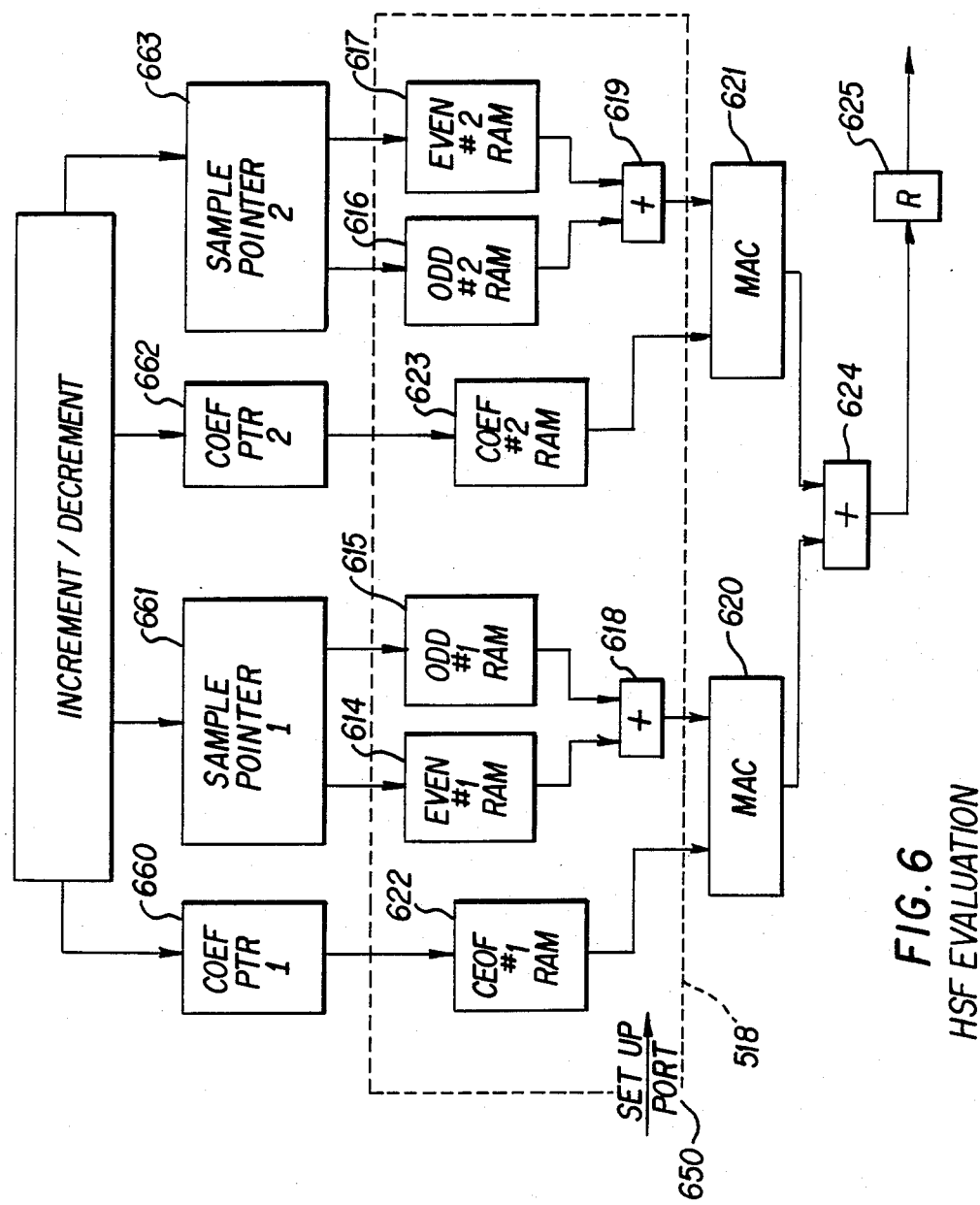
FIG. 6 shows the supply of data and coefficients to the high speed filter according to the invention and shows the calculation process resulting in one word output samples from the filter.

The memory address multiplexer 518 is shown in detail in FIG. 6. This includes a setup port 620 for memory access for setup and verification of the memory. The HSF card operation is based on four data RAM banks 614–617. The addressing of the individual banks must be independent to provide the four data values corresponding to the four taps being evaluated in the current clock period. Each bank is 2k×16 bits. The RAM banks are designated even and odd corresponding to successive data samples. That is, the HSF maintains two copies each of even and odd data. The duplicate copies of even data are contained in the EVEN 1 and EVEN 2 data RAMs 614 and 615. The duplicate copies of odd data are held in the ODD1 and ODD2 data RAMs 616, 617. The sequential sample technique was implemented to reduce (divide by 2) the memory bandwidth required for storing input data from the translator; the translator operates at 18 Mega-translations/sec each for Re and Im data. When successive samples are paired, the memory bandwidth required for HSF input data storing is 9 MHz.

As mentioned the four banks of RAM 614, 615, 616, 617 (each of 2K words) contain two duplicate copies of the EVEN and ODD data which has been stored. One even and one odd RAM each have their outputs summed in summation units 618, 619. The results are fed to multiplier-accumulator units (MACs) 620, 621. The filter is of the transversal type, and is of modulo 4 taps in length; the filter must also be symmetrical.

Two banks of coefficient RAMs 622, 623 are used in the HSF design. These RAMs contain identical copies of the coefficients of the FIR filter for each channel. Duplicate RAMs are required since two successive coefficients must be accessed each clock cycle. However, a slower RAM can be used for coefficient storage since a store cycle does not interrupt the coefficient look-up process. Duplicate sets of coefficient information are kept to independently supply both of the MACs 620, 621. Alternate coefficients are accessed by the two MACs 620, 621 corresponding to the even or odd sample pairs being processed.

The FIR filter evaluation occurs as follows. Four data pointers (addresses) start initially centered in the portion of the data RAM which is involved in the evaluation. The coefficients of the FIR filter are discrete values corresponding to the impulse response of the desired low pass filter. The coefficients are symmetrical about the center of the filter. The filter may be "folded" by summing the symmetrical pairs of data samples. A final sum is required to bring the two segments together. This is done by summation unit 624, yielding an output sample stored in a register (R) 625.

Those of skill in the art will now appreciate the advantages provided by use of four data RAMs 614–617 and two coefficient RAMs 622 and 623. Four samples (2 symmetrical pairs) are summed in summation units 618 and 619 and two successive coefficients supplied to MACs 620, 621. Their outputs are summed at 624, resulting in a one-word output sample stored in register 625. Filter evaluation is complete when the extremes of the filter are reached.

The function of generating evaluation data and coefficient addresses, that is, pointers to the coefficient and sample RAMs, is accomplished by logic 650 shown schematically in FIG. 6. In the initialization mode, microprocessor 328 (FIG. 3) supplies initial coefficient and sample RAM addresses to coefficient and sample pointer registers 660–663. Thereafter, in the run mode, increment/decrement logic increment these pointer registers 660–663 as needed. Incrementing/decrementing can be done by amounts greater than 1 for implementing half band type FIR filters.

Decimation ratios of 2, 4, 8, 16, 3, 6, and 12 are supported by the HSF. Only a single stage of filtering may be implemented in the HSF. However, it is possible to use another control element to cause samples to be passed through the filter more than once, where this would be desirable, essentially independent of the filter function. The translator, for example, can control operation of the preselect filter in this manner, so that multiple iterations of preselect filtering can be performed.

The coefficient RAMs 622, 623 are similarly addressed by incremented pointers in registers 660, 662. No decimation of the coefficients need be performed. The coefficients are loaded in RAM corresponding to this access sequence.

IV. THE TRANSLATOR

A. In General

The Translator card performs the function of frequency translation to baseband of the individual channels in the frequency multiplex. Translation allows the subsequent filtering in the first and second stages to be implemented as low pass, instead of bandpass type. This minimizes the processing power required for the subsequent filtering function.

More specifically, the Translator card performs the functions of preselect filter control, delay equalization, tape speed compensation, individual channel translation, sample stream selection on a channel basis, and synchronous sample clock generation.

As discussed in detail above, the preselect filter function is accomplished by a high speed filter card capable of evaluating 4 filter taps each clock cycle (9 MHz). The input stores of raw samples are automatically interleaved with extraction to support evaluation. This provides 100% utilization of the filter evaluation hardware. The translator card pairs input samples and performs synchronous stores into the preselect filter, providing a circulating store address. Outputs from the first iteration of preselect filtering (PS1) may be paired and looped back into the preselect filter for a second iteration (PS2) of filtering.

The Tape Speed Compensation (TSC) information is extracted from the input signal and used to correct the corresponding delayed samples. So that this can be done with the correct timing, the outputs of the two preselect filter iterations are passed through separate programmable delay elements. These pad the delays out to exactly equal the processing time of the tape speed compensation channel. The sample rate data is sent through a third delay element, also used to equalize TSC processing delays. In this way, TSC is applied to the samples corresponding to the reference channel samples.

The correct sample stream (Sample rate, Sample rate delayed, Preselect 1, or Preselect 2) is selected for each channel. The reference channel utilizes the sample rate stream, which is not delayed. The other channels are delayed an amount equal to the processing time of the reference channel, as mentioned. This allows the processed reference channel result to be used for tape speed correction. The TSC correction is accomplished on the delta phi values, that is, the phase difference values representing the center frequency signals are compensated for variation in tape speed. After TSC is applied, the samples are translated and output. The translator is capable of translating a sample to real and imaginary components at an 18 MHz rate. Two successive samples from a channel are translated as a pair to reduce the output rate to the first stage filter cards. Output rate is four values, two each real and imaginary, at 9 MHz.

B. Translator Functions and Capabilities

1. The Translator card accepts an 8 bit wide data stream from an analog input card carrying an anti-aliasing filter and A/D converter. A preselect filter 304 may be interposed to filter lower-frequency data.

2. The Translator card provides the timing to drive the high speed filter card in the preselect filter implementation, to provide a further preselect digital filtering capability. The further preselect filtering obtained by low-pass filtering the input stream provides two data streams of decimated sample rate and proportionally reduced bandwidth. These streams allow for reduced processing of channels which can be adequately represented using the streams. The two streams are sourced from successive iterations of filtering, the sample rate of the second iteration being the product of the first and second stage decimations. Supported decimation rates for the two iterations are any combinations of 2, 4, and 8:1 decimations.

3. The Translator provides bulk delay equalization for the sample rates, Preselect 1(PS1) and Preselect 2 (PS2) sample streams. This allows equalization of the tape speed reference channel processing delay. Tape speed correction information, correctly aligned in time, may now be applied.

4. The Translator uses an elastic buffer timing equalization technique to align the sample rate data, PS1 data, PS2 data, and TSC information to the 9 MHz processing clock. This properly aligns these external events to the translator control sequencer operation. This technique precludes any requirements that the subsequent processing produce an output at a specific time.

5. The control sequencer of the translator card provides a zero overhead environment allowing the full 18 M samples/sec translation capability to be utilized. The control sequence allows source stream selection on an individual channel basis. Time slot multiplexing for preselected channels is also supported.

6. In order to provide values for the channel center frequency signals with which the input samples are mixed, the phase accumulator provides 18-bit delta phi values for the sine and cosine of the center frequency signals. This is comprised of a two-bit exponent and a sixteen-bit mantissa. The phase accumulation is done as a 20-bit representation.
7. The output of the translator 306 provides two each real and imaginary values (16-bits) and an 11-bit store address. The address is comprised of a channel identifier, and a buffer pointer. This approach allows the 18 M sample/sec translation rate, but limits the maximum transfer rate to one half that value. The two samples are successive samples.

C. Translator Operation

When a signal is sampled, the frequency content of the sample sequence can be preserved provided adequate anti-aliasing filtering is provided. The anti-aliasing filtering is accomplished in the preferred embodiment of the invention on the analog input card (FIG. 4). The function of frequency translation is to translate the channel of interest to baseband (or D.C.). However, since the channel of interest was not isolated prior to translation, all channels including the one of interest will be translated. After the translation, low pass filtering is therefore required to isolate the channel of interest. The first and second stage real and imaginary filters provide this filtering.

The translator output being a convolution of sample stream of an input signal with sin and cos components, which are themselves lookup-table values, is also a sampled output signal.

Since convolution in the frequency domain corresponds to multiplication in the time domain, the circuit is implemented with multipliers. FIG. 8 shows the translator circuit is in block diagram form. A digital numerically controlled oscillator (NCO) 800 provides sine and cosine value pairs to the plural multipliers 802. Corresponding input sample values from the several input sample streams, multiplexed by a multiplexer 804, are the other input to the multiplier. Two sequential resulting values are paired at the output, and passed to the first stage filter card.

The NCO 800 accumulates unique incremental phase values corresponding to each channel. That is, NCO 800 accumulates delta phi values corresponding to (t), such that sin (sum delta phi) and cos(sum delta phi) for any delta phi for each channel can be looked up in tables. The 20-bit accumulated value for delta phi corresponds to $2\pi W_c$, where $W_c$ is the center frequency of the channel in radians. For channels operating on sample rate information the incremental phase value (delta phi) is added the accumulated phase value each sample time. A crystal oscillator used to provide delta phi on the translator (not shown) is accurate within ±0.005%. This combined with the 20-bit phase accumulation allows the individual center frequencies to be tracked within ±0.01% for center frequencies over a 16:1 range. If the center frequencies extend over a greater than 16:1 range, preselect filtering may be used to achieve up to a 1024:1 range.

More specifically, two PROM tables 801a and 801b comprised by translator NCO 800 are used to provide sine and cosine values. The current accumulated phase stored in sum delta phi RAM 818 plus the delta phi for the channel of interest is truncated to 10 bits. This value is used as the address to "look-up" the PROM table values. The ten bit address provides for every binary step from −127 to 127 to be associated with at least one phase value. The sine/cosine value range of −127 to 127 is used for the required symmetry about zero.

The data samples may then be translated. This occurs after the delays have been equalized, the samples selected, the delta phi and sum delta phi values calculated, and TSC applied (as discussed below). Two successive data samples from the selected stream arrive. The truncated values of sum delta phi + delta phi, and +2 × delta phi are used for table look-up of cosine and sine tables, resulting in two signed 8-bit numbers. This process creates two successive real and imaginary values encoding the original modulation signals.

D. Tape Speed Compensation

It is frequently desired to store the received signal prior to demodulation; this is conveniently accomplished using a tape recorder. Tape playback speed varies somewhat, so that tape speed compensation (TSC) is required in order to avoid distortion of the modulation signals. To this end, an unmodulated reference subcarrier frequency is recorded along with the FDM signal.

According to the present invention, TSC capability is provided on the translator card. A selected reference channel is captured from the output data stream. An elastic timing buffer is provided to equalize the time skew between this function and the Translator sequence controller. The amplitude fluctuation of this value corresponds directly to a variation in tape recorder play back speed.

Since delay equalization is applied to all channels to match the processing time of the reference channel, the TSC value for each processed reference channel output sample is representative of the tape recorder speed variation present in the current delay equalized sample. Since the proportional change in speed is known, the current delta phi values may readily be adjusted to compensate. This is equivalent to correcting the NCO frequency $W_c$ for the true instantaneous center frequency of the channel.

In a particularly preferred embodiment of the present invention, the translator processes duplicate sets of data at once. This is done in order to increase the sample rate from the 9 megahertz rate at which the memory can accept data to the 18 megahertz rate which is employed by the translator. This rate is necessary to conform to the standard multiplexers which are available.

The data sample for translation is selected by multiplexer 804 from one of four streams. These sources are at the sample rate (line 810), sample rate delayed (line 811), Preselect 1 (line 812), or Preselect 2 (line 813) data streams. The Translator matches the delays of the sample rate delayed, Preselect and Preselect 2 data streams. This is done with programmable delay circuits 814–816, which are initialized to provide the correct delay values. In this fashion the data arrives at the translating multipliers 802 at the same absolute time regardless of selected source stream. Although TSC is applied indirectly through the delta phi adjustment, this individual time correction is critical to applying the TSC adjustment at the correct point in time. That is, TSC is derived from the result of processing the reference channel; its correction must be applied to the corresponding samples. Hence use of the delay elements 814–816. This delay equalization is also required to time-correlate the output signals. To achieve time correlation, the processing delays through the remainder of the system of the invention must also be equalized. By setting these delays to the processing time of the reference channel, the reference channel output may be "looped-back" to compensate for tape recorder wow and flutter. The reference channel is processed from the sample rate (undelayed) sample stream. No delay is incurred other than the processing delays for the reference channel.

The control of the Translator card is based on a FIFO and an adder, shown together as a control sequencer 820. A control store sequence (that is, of channels to be processed) is loaded into the FIFO by the microprocessor at initialization. This sequence is then repeated indefinitely. This sequence establishes the channel ordering for translation.

E. Setup of Translator

The setup information required by the Translator card and supplied during the initialization mode by the microprocessor includes the following items:

(1) Delta Phi values for each channel. 1 value for each of 1–24 channels are written to delta phi RAM 819. The corresponding Sum Delta Phi value stored in RAM 818 is automatically cleared when Delta Phi is written.
(2) TSC information corresponding to the selected reference channel.
(3) Program delay values for sample rate, PS1, and PS2 sample streams.
(4) Decimation ratios for PS1 and PS2 relative to the sample rate.
(5) The control store sequence. The control store FIFO (in sequence 820) must be loaded with the expanded sequence of control words. This sequence identifies channel, source stream, control synchronization, and output store address.

The three delay equalization elements 814, 815, and 816 corresponding to sample rate, PS1, and PS2 are programmed to equalize the total delay in each of the three sample streams. The total delay in each case is set to equal the total processing delay of the tape speed compensation reference channel.

The three delay equalization elements 814–816 are identical with the exception that the sample rate delay 814 provides for a delay of up to 16K samples. The other two elements 815–816 provide a delay of up to 8K samples. This is sufficient since there is a minimum 2:1 decimation per stage of preselect filtering. The maximum operation rate of the delay elements is 3.6M sample/sec. This is sufficient since only one channel may be processed at the highest rate of 7.2M sample; therefore the decimation function is not used at this rate.

Delay element operation is based on a single pointer architecture. A read before write sequence is employed. When a sample arrives, the current pointer location is read and provided as the delayed output. The memory location just vacated is used to store the incoming sample. The size of the delay is fixed by a programmable counter which sets the amount of memory through which the buffer circulates. The delay is set to the time between two subsequent accesses of a memory location.

Once the individual channel delays are equalized, they may be normalized to equal the processing delay of the tape speed reference channel. In this case the result of the reference channel processing is a value proportional to tape speed variance. This value is multiplied by the individual delta phi values. The result is that the individual channel phase accumulated is changed by the same proportion. This in turn corrects the center frequency $W_c$ of each channel to be consistent with instantaneous tape speed, prior to processing the data.

Finally, sample pairing is used to reduce processing rates on the translator card. The basic translation rate is 18M translations/sec. If all samples were handled individually, all associated functions would have to operate at this rate. By handling sample pairs together, the functions of control, delta phi lookup, sum delta phi store, TSC computation, and the effective output rates are all reduced to a 9 MHz rate.

V. THE HIGH PRECISION FILTERS (HPF)

A. In General

Two HPF cards are used in the Digital Discriminator according to the invention. One is used for the second stage real and imaginary filters 316, the other as the Low Pass Output Filter (LPOF) 320. The cards are configured (via PALs) for the specific application. The variations which are encountered dependent on the use of the HPF are detailed below. The second stage filter 316 configuration reduces the evaluation capacity to 2 taps/clock. The LPOF 320 is configured as coordinated sections (Re only) operating at 4 taps/clock. Block diagrams of the two configurations are shown as FIGS. 10 and 11.

The second stage filter follows the first stage filter in the digital discriminator data flow. The function is, however, an extension of the first stage filtering. The output of the first stage is decimated, and attenuated uniquely in the frequency domain for each channel. In general, the complex filtering could all be done in a single iteration. However, this technique is not the most efficient in terms of processing power required.

What must be accomplished by the first and second stage filtering prior to the detector card 318 is:
1. The flat final filter bandwidth must equal twice the specified deviation frequency ($f_d$) of the channel.
2. The bandwidths of all preceding stages/iterations of filtering must be at a frequency above twice $f_d$, so as not to attenuate the frequency band of interest.
3. The output sample rates of all stages/iterations of filtering must be sufficient to ensure that no aliasing occurs in the band of interest.
4. The sample rate into the detector 318 should be as low as possible within the above constraints.

The maximum achievable filtering in the first filter stage 314 is limited by the processing power available, and the decimation rates which are supported. The second stage filter 316 continues the job of reducing the sample rate and bandwidth on an individual channel basis.

Figure 9:
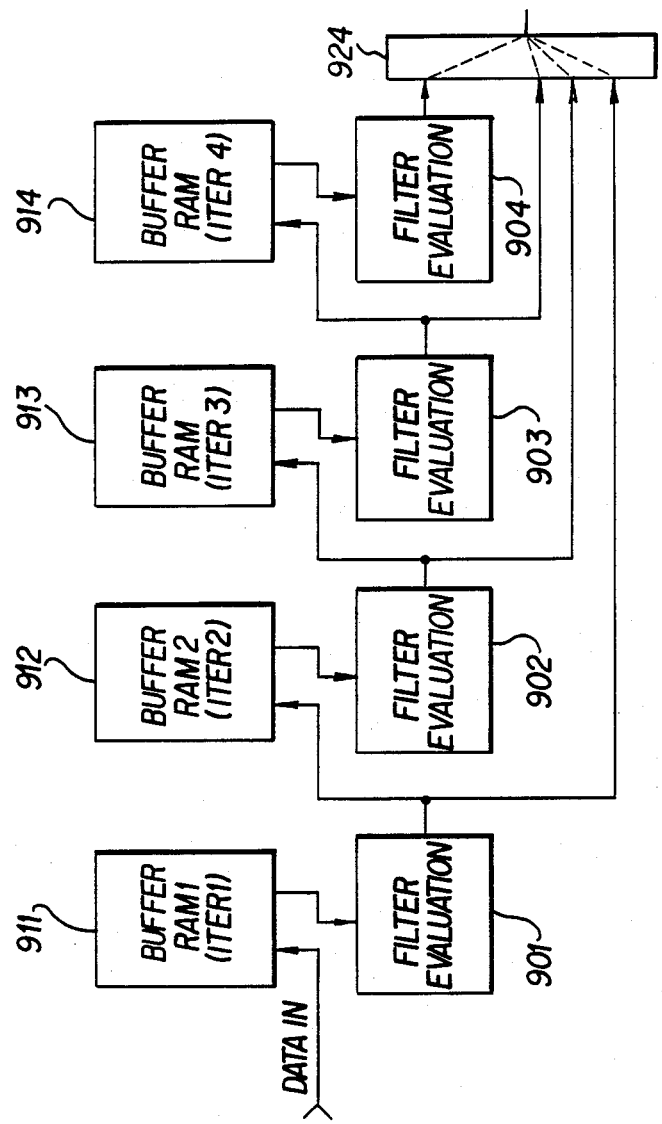
FIG. 9 shows a block diagram of the high precision filter showing use of multiple buffer and evaluation stages for high precision filtering.

The second stage filter supports up to four iterations of filtering. This provides adequate bandwidth reduction capability without requiring an excessive number of taps overall. FIG. 9 shows this in block diagram form. The samples input to each of four evaluation stages 901–904 are stored in buffers 911–914. When the samples have been multiplied by the coefficients in the evaluation stages 901–904, the results may be selected for output, or stored into the following iteration buffer. These iterations are independent in terms of length, type of filter (even type, or half band) and coefficients. The processing for each channel may be uniquely tailored to its requirements.

The second stage filter provides the function of resolving the sample rates of all channels in the decimated multiplex to the correct binary multiple.

The preselect filter 304 may perform two iterations with 8:1 decimation rates. By comparison, the second stage filter is used to resolve channel sample rates, individually, to the proper binary multiples within the 8:1 and 64:1 range. A very wide range of effective channel sample rates is supported (that is, allowing for a wide variety of input signal modulation frequencies) when a second iteration preselect filter decimation of 64:1 is considered in addition to the filtering capability of the second stage filter. A maximum channel sample rate range of 2048:1 is provided in the preferred embodiment of the invention. Within this range the sample rate may be controlled in 2:1 steps through selection of the preselect and second stage filter capabilities.

Half band filters are supported by the HPF, and may be used in the second stage filter application. The advantage of this is the reduced processing power required to accomplish the evaluation compared to non-halfband filters. The fact that the coefficients may be identical for a series of halfband iterations simplifies the multiplex description file stored and accessed by the microprocessor in the initialization mode. For the computation-intensive multiplexes this processing reduction may be the way in which all the required processing can be completed.

The second stage filter may be utilized up to 100% of its specified processing bandwidth. The filter evaluation rate is 18 MTaps/sec each Re and Im. The HPF is structured to perform 36 MTaps/sec of filter evaluation. In the second stage filter application, the HPF is configured to evaluate Re and Im filter sections simultaneously at ½ the 36 MTap/sec rate. For analysis purposes the processing rate must be reduced corresponding to the number of memory stores required. The evaluation process is interrupted when a store cycle is requested. The store cycle takes one clock. Stores occur both when the data is initially input to the card, and also when data is "looped back" for successive iterations. An output to the detector 318, however, does not require a store cycle.

B. HPF Functions and Capabilities (1) The High Precision Filter (HPF) provides buffering capability to maintain four iterations of data samples corresponding to four iterations of filtering. These buffers provide for 64 samples.

(2) The architecture of the HPF provides arbitrated memory access. The arbitration control prioritizes requests from the loop back, input, and evaluation circuits.

(3) The HPF is capable of evaluating any sequence of filters at an effective rate of 36 MTAPS. This includes any sequence of iterations as well as channels. This rate is reduced by 4 taps corresponding to a store, either loop back or input.

(4) The FIR filter evaluations supported by the HPF may be an even or odd number (half band type) of taps. Half band type evaluations are also supported. The filters must be symmetrical.

(5) The HPF operates on the buffered data in a synchronous manner based on a 9 MHz processing clock. The sequence in which filters are evaluated is determined by the control channel sequence which is generated by the first stage filter.

(6) The two operations of evaluate and store proceed independently, but are synchronized at discrete time intervals. This interval of synchronization is generally some integer multiple of the first stage decimation rate.

(7) The resulting output of the HPF provides a store address and data value. The effect is to create a circular data buffer in the following stage buffer memory.

(8) The HPF implements up to four stages of filtering on the channel sequence. The supported decimation rates are 1, 2, 4, 8, 3, or 6. Delay stages may also be implemented.

(9) Signature generation capability is provided at the output of the HPF card.

The High Precision Filter (HPF) card provides more flexibility than the High Speed Filter. The HPF supports 24 separate channels with capability to perform 4 iterations of filtering on each. Half band filters are supported as well as non-half band filters, with the advantage of half band type being reduced processing time. Use of a programmable delay (single tap filter) is also possible. The four iterations of filtering are independent in terms of filter type, coefficients, and decimation rate. The hardware is capable of processing 4 taps/clock at a 9 MHz rate (LPOF), and 2 taps/clock for both Re and Im (2nd stage) in the second stage filter. Performance evaluation must consider that a store cycle (external or internal source) "steals" a clock cycle. This reduces the evaluation capacity by a proportional amount.

The setup information required by the HPF includes the following items:

(1) Type and length of each filter. 1-24 channels with 1-4 iterations/channel may be provided. Length is restricted to 4-64 taps.

(2) Coefficients for each filter in (1). 1-24 channels with 1-4 iterations/ch with 2-32 coefficients for each iteration.

(3) Control store word for each filter, delay, or dummy iteration. 1-24 channels with 1-5 pointers/channel.

Figure 10:
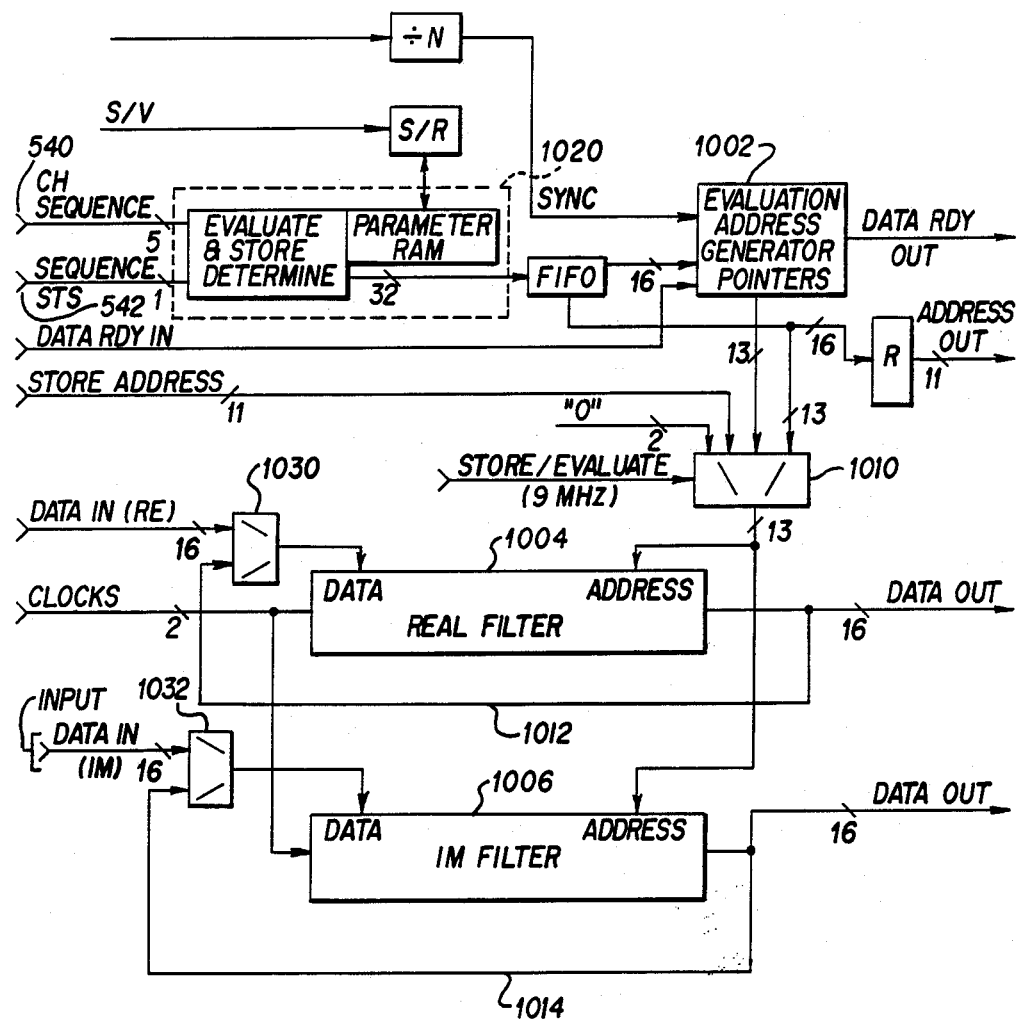
FIG. 10 shows a block diagram of the high precision filter implementing the real and imaginary low pass output filter function.
Figure 12:
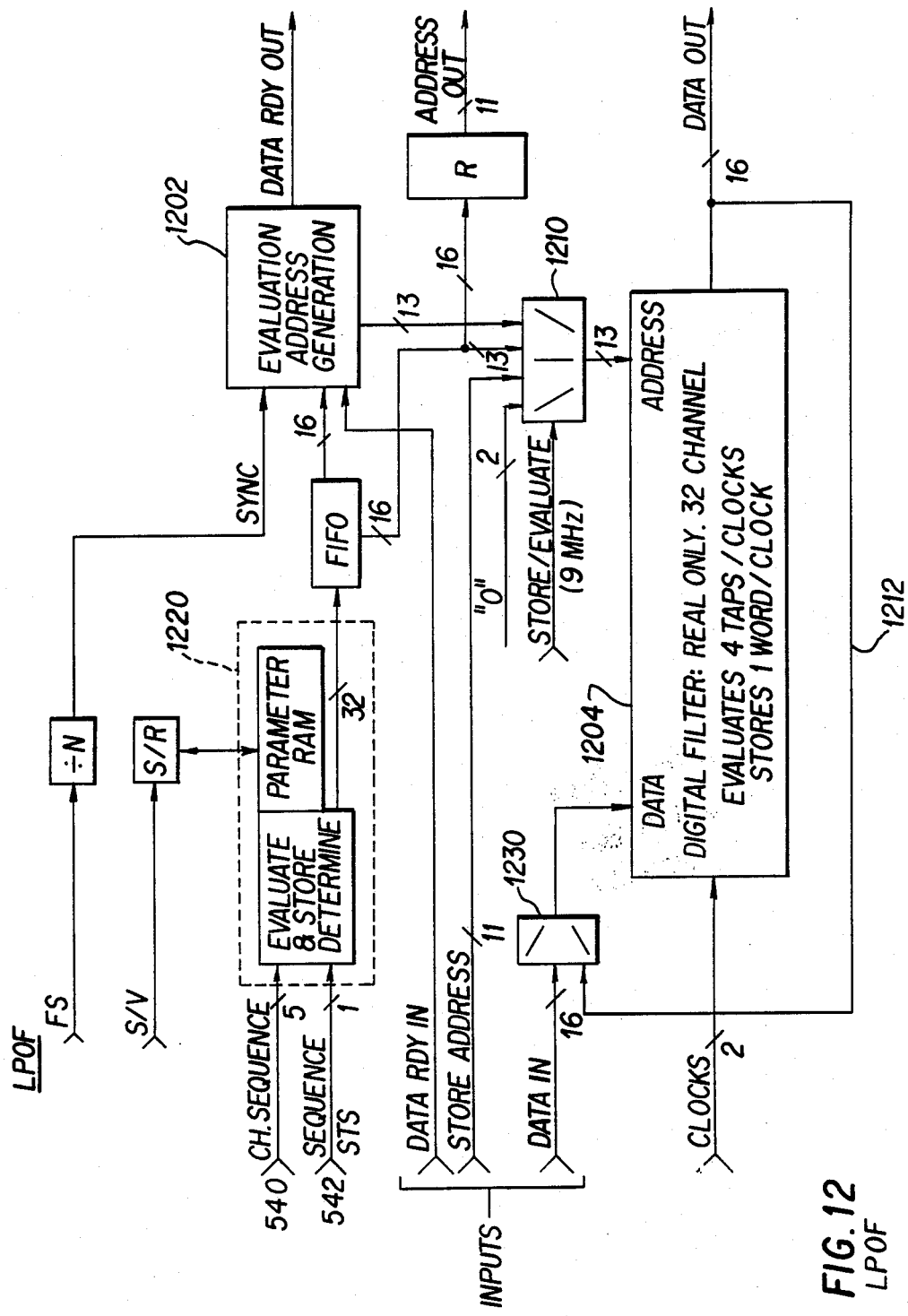
FIG. 12 shows the high precision filter configured for use as a low pass output filter.

FIGS. 10 and 12 show two uses of the high precision filter which is shown in block diagram form in FIG. 9. FIG. 10 shows the configuration of the high precision filter as used in the second stage of the real and imaginary filters, both being shown on FIG. 10, while FIG. 12 shows the high precision filter as used at the low pass output filter. In both cases, and as in the case of the high speed filter in FIG. 5, an evaluation address generator appearing at 1002 at FIG. 10 and 1202 at FIG. 12 provides pointers which provide addresses to RAM comprised by the digital filter blocks, 1004 and 1006 in FIG. 10 and 1204 in FIG. 12.

In the HPF case, however, the 9 megahertz clock is used for three different functions. Pointers for addressing data to be evaluated are supplied from registers 1002, 1202 in some of the 9 megahertz cycles. In others, storage addresses newly for input samples are supplied via multiplexers 1010 and 1210. The third function provided is the loopback function provided by data pathways 1012 and 1014 in FIG. 10 and 1212 in FIG. 12. As shown in FIG. 9, the HPF involves evaluation of the same data a number of times, multiple iterations of the same data within a single physical filter circuit. The loopback paths 1012, 1014 and 1212 are required to support such multiple iterations. Multiplexers 1030, 1032 (FIG. 10) 1230 (FIG. 12), select between looped-back and new samples.

Figure 5:
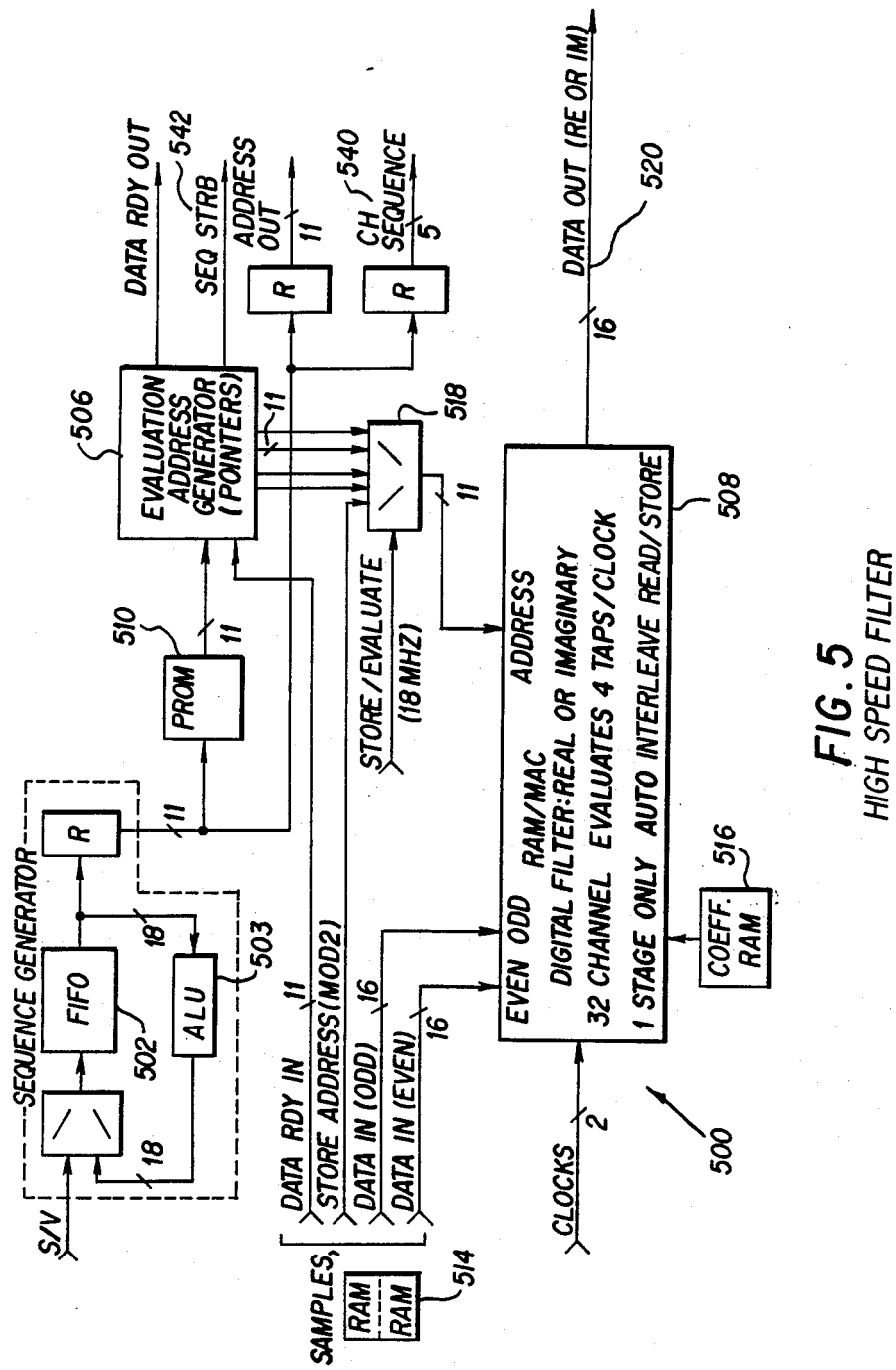
FIG. 5 shows a block diagram of a high speed filter circuit used at several points in the demodulator of the invention.

Another distinction between the high speed filter shown in FIG. 5 and the high precision filter shown in FIGS. 10 and 12 is in the control sequence. As discussed above, the high speed filter shown in FIG. 5 uses pointers which are incremented to access successive locations in memory for addressing samples and coefficients for filtering. However, the variation in sample rates which are presented to the high precision filter (HPF) render this approach too complicated to run efficiently. Therefore, the control sequencers indicated at 1020 in FIG. 10 and 1220 in FIG. 12 employ channel sequence and sequence strobe signals which are output by the high speed filter of FIG. 5 at 540 and 542 respectively (in the first stage real and imaginary filter embodiment, not in the preselect filter embodiment) and appear under the same reference numerals in FIGS. 10 and 12.

The sequence strobe signal 542, for example, is output each time one of the first stage high speed filters outputs a sample. The channel sequencer 1220, for example, counts these and uses them, in conjunction with information stored therein during initialization, to determine when a filter iteration should be performed, that is, responsive to the decimation ratio desired for the particular channel being analyzed at any given time. This is very efficient as compared to an arrangement, for example, in which individual control words were generated for operation of the high precision filter; immense amounts of memory would be required to generate these control words if a nonsample-based control technique were used. Instead, operation of the high precision filter is controlled simply in response to the arrival of samples from the high speed filters.

To reiterate, the major functional difference between the HPF and the HSF is that the HPF supports multiple iterations of filtering. As a direct result, the process implemented by the HPF in any particular clock cycle must be arbitrated between three functions:

(1) Loopback stores
(2) Input stores
(3) Evaluation accesses.

The requests for memory usage come from these alternate sources. The requests may come in any order, or sequence; no assumption is made about the nature of the requests other than the maximum input rate will not exceed 3 times the 9 MHz clock rate.

By comparison, the HSF simply alternates between input stores (writing new samples to RAM) and memory accesses (supplying data to the filters for evaluation). Since the HSF is single-iteration, no loopback function need be supported.

The memory requests are arbitrated by the HSF in the following order:

(1) Loopback request
(2) Input stores
(3) Evaluation access.

VI. THE DETECTOR

Figure 13:
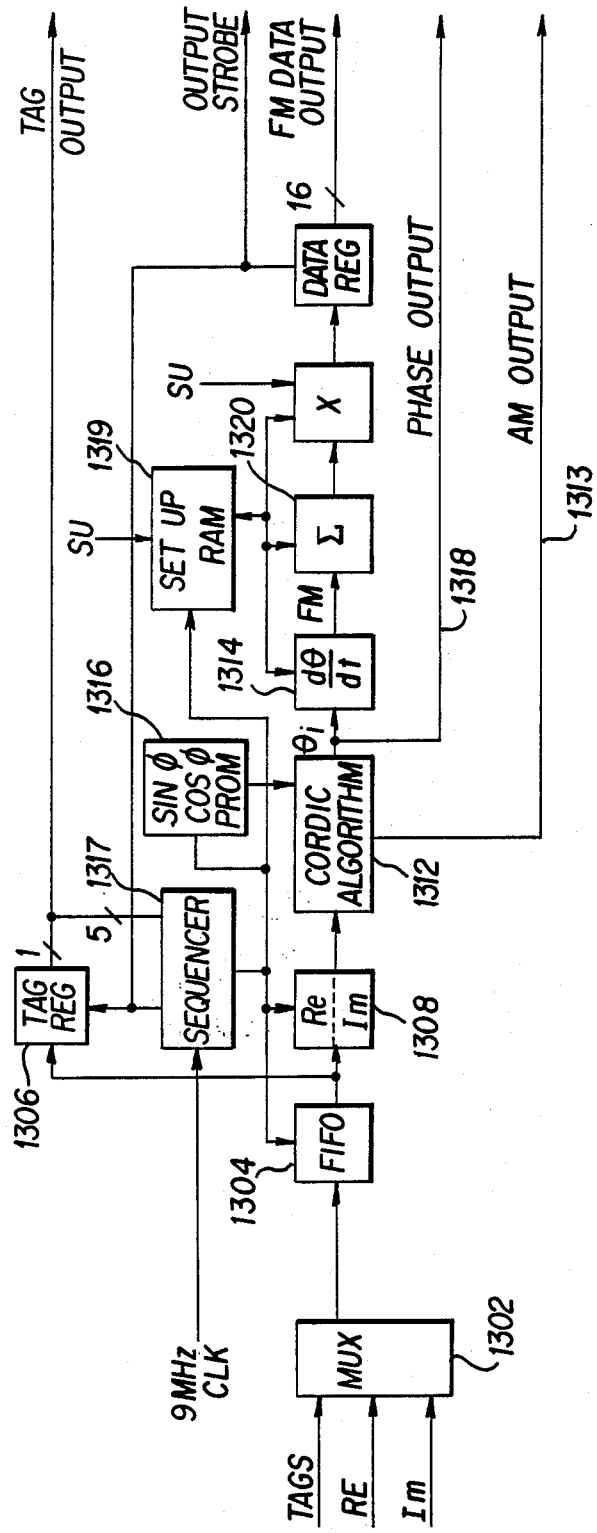
FIG. 13 shows a block diagram of the FM detector card.

FIG. 13 shows a block diagram of the detector circuit employed in the preferred embodiment of the invention. A multiplexer 1302 receives real and imaginary filtered samples from the high precision filter previously discussed. These are associated with tags which indicate the channel of interest, the tags having been generated in the translator (see FIG. 8). The real and imaginary samples with the associated tags are stored in a first in first out (FIFO) buffer 1304. The tags are stored in a tag register 1306, and are employed to identify the channels with which the samples are associated. The real and imaginary samples are then stored in real and imaginary registers 1308, 1310 for supply to the Cordic algorithm processing unit 1312. Operation of the detector is controlled by a sequencer 1317.

As described above, the real and imaginary components which are stored in registers 1308 and 1310 with respect to each sample represent orthogonal components of a vector in the complex plane. The vector is of length R and makes a phase angle phi with respect to the real axis. The length R of the vector is equal to the square root of the sum of the squares of the real and imaginary components, and the angle phi is equal to the arctangent of the imaginary component divided by the real component. If the original signal was frequency-modulated, the modulation is the derivative of the angle phi with respect to time. The length of the vector is proportional to the actual amplitude of the original modulated subcarrier frequency. Accordingly, if the input signal were an amplitude modulated signal this amplitude modulated information can be recovered as noted at 1313 by detecting the amplitude of the vector at this point. Similarly, if a phase modulated input signal were demultiplexed using the system of the invention, the phase information phi output by the Cordic algorithm unit 1312 could be used directly.

In the particular embodiment of the invention as discussed herein, the input signal is a frequency modulated signal; therefore the output of the Cordic algorithm unit 1312 is supplied to differentiator 1314 in which the derivative of the phase as a function of time is taken, yielding an output signal 1311 equivalent to the input modulation signal.

The Cordic algorithm is generally well known to the art and is described in Volder, "The Cordic Trigonometric Computing Technique," *IRE Trans. Electron. Computer*, Vol. EC-8, pp. 330–334, September 1959. In essence, this is a successive approximation algorithm which yields a digital number indicative of the angle made by a vector to an axis. This can then be used to access a lookup table 1316 to generate an actual angle value for angle phi, which may be directly output as the phase modulation output if desired, as indicated at 1318.

If desired, an offset may be added at 1320 to the output signal; it may also be scaled at 1322 to any convenient output amplitude range. A setup RAM 1319 can be employed to store suitable control signals.

The data may then be stored in a register 1324 and may be supplied in any desired format. Tag information stored in tag register 1306 is used in assembling the samples in any desired form. It will be appreciated that a series of samples is supplied by the FM detector 1314, each corresponding to differing ones of the channels. For some applications, it may be desired to remove this time division multiplexing of the input channel and supply output data channel by channel; alternatively, there may be applications in which it is preferred to retain the data in the time division multiplexed, channel by channel format. Such processing is within the skill of the art and not pertinent to the present invention.

VII. LOW PASS OUTPUT FILTER

A. In General

The Low Pass Output Filter (LPOF) 320 follows the detector card 318 in the data flow of the digital demodulator according to the invention. The detector function outputs a time domain signal as it is reconstructed from the frequency domain representation. The resulting signal is passed to the LPOF 320 for band limiting. The bandwidth limitation is established under operator control as a 1:1, 2:1, 4:1, or 8:1 ratio of the deviation frequency (fd/fout). For example if the deviation frequency for a channel were 1 kHz, the LPOF bandwidth (3 db point) could be specified as 1 kHz, 500 Hz, 250 Hz, or 125 Hz, corresponding to deviation ratios of 1:1, 2:1, 4:1, and 8:1, respectively.

More particularly, the bandwidth of the signal output from the detector is the frequency of the original modulation signal. However, the modulation may only occupy a fraction of the deviation bandwidth. Accordingly, any remaining amount of the deviation bandwidth can be filtered from the frequency modulation to yield an improvement in signal to noise ratio due to the reduction in bandwidth.

Figure 11:
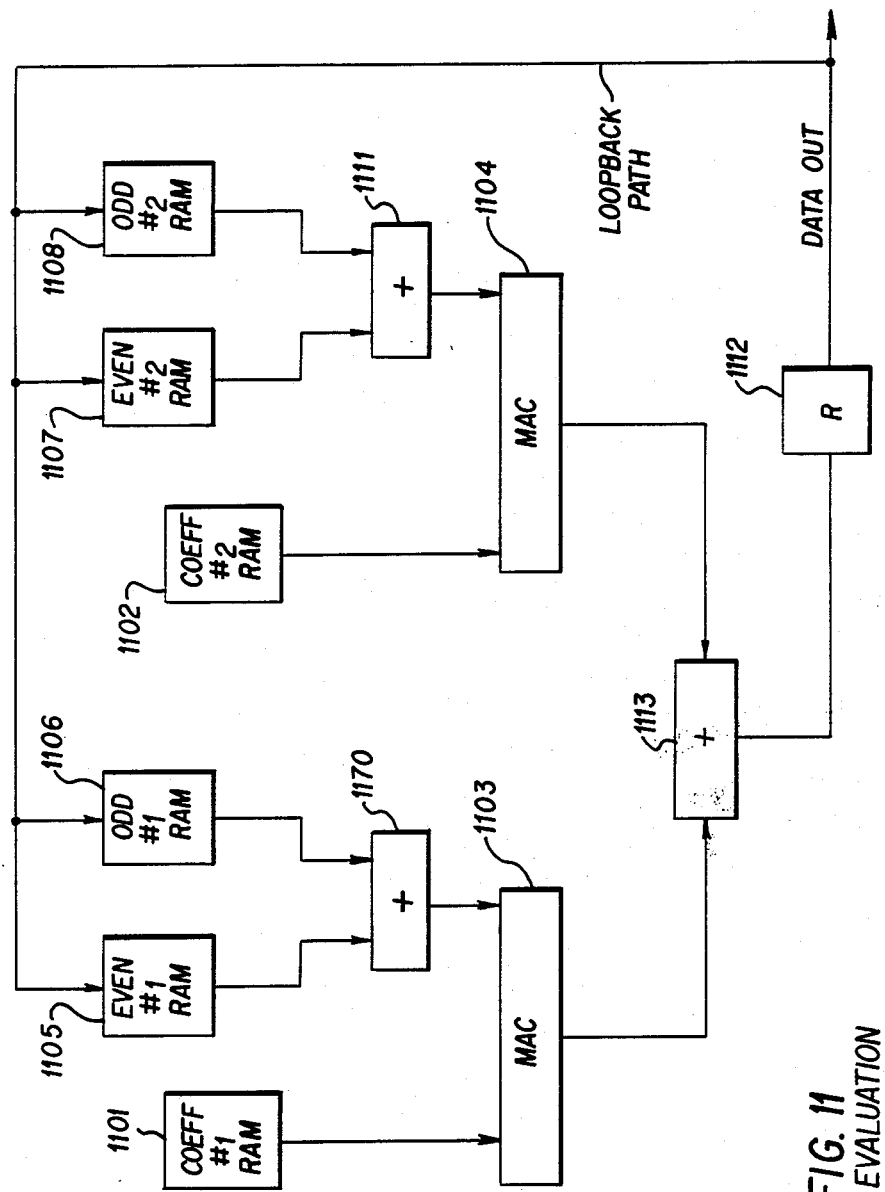
FIG. 11 shows the supply of samples and coefficients to the low pass output filter.

FIG. 11 shows two filter coefficient RAMS 1101, 1102 employed by the HPF when configured as an LPOF. Duplicate sets of coefficient information are kept to supply two MACs 1103, 1104. Alternate coefficients are accessed by the two MACs corresponding to the alternating pairs of samples being processed. These RAMs 1101, 1102 are initialized by the microprocessor 328 during initialization. The coefficients are addressed by the channel sequence data 540.

FIR filter evaluation in the LPOF 320 is executed as follows. Four data pointers (addresses) start initially centered in the portion of one of the data RAMs 1105-1108 containing the samples involved in the evaluation. The coefficients of the FIR filter are discretized values corresponding to a desired impulse response of the desired low pass filter. The coefficients are symmetrical about the center of the filter.

As in the case of all of the filters used in the preferred embodiment of the invention, filter coefficients corresponding to the more common channel characteristics ar stored in ROM at manufacture of the unit. These values are selected by microprocessor 328 during set-up of the unit in an initialization mode, responsive to operator selection of the channels of the multiplex. Common multiplexes (collections of channels) may be stored as well for operator convenience.

Four samples (typically 2 symmetrical pairs) are summed in summing nodes 1110, 1111, resulting in two successive sample sums. These sample sums are multiplied in MACs 1103, 1104 by two successive coefficients. The HPF not only supports even, but also half band (odd) tap filter lengths. The filter evaluation is complete when the extremes of the filter are reached.

The final portion of this block is an adder 1113, which sums the two MAC outputs in LPOF mode, and outputs the sum in latch 1112. The sequence of samples are a time-division multiplexed series of samples corresponding to the original modulation signals; these can be provided to serial and parallel data formatters 322, 324 for provision of any desired output signal format.

While a preferred embodiment of the invention has been described in detail, this should not be construed as a limitation on the invention, which is limited only by the following claims.

We claim:

1. Apparatus for demodulating a frequency-division-multiplexed input signal having modulating information and one or more subcarrier channels, comprising:
    input means for receiving said input signal,
    analog-to-digital conversion means in communication with said input means for providing a series of digital words corresponding to the instantaneous amplitude of said input signal,
    translation means in communication with said analog-to-digital means for removing the subcarrier of each of said subcarrier channels of said input signal and producing translated signals, and for providing real and imaginary components of said translated signals encoding phase information corresponding to the modulating information in the input signal for each of said subcarrier channels,
    low-pass filter means in communication with said translation means for selecting out the real and imaginary components of each of said translated signals, and
    demodulating means in communication with said low-pass filter means for recovering modulation of said translated signals, wherein said demodulating means comprises means for analyzing said phase information.

2. The apparatus of claim 1, wherein said translation means represents said phase information by an angle in the complex plane, and wherein said demodulating means measures said angle by a successive approximation technique.

3. The apparatus of claim 2, wherein each subcarrier channel of said input signal is a frequency-modulated subcarrier and the modulating information of said input signal is recovered by said demodulating means as the rate of change of the phase information.

4. The apparatus of claim 1, further comprising means for decimating lower-frequency input data subcarrier channels prior to said translation means receiving said input signal.

5. The apparatus of claim 1, further comprising means for storage of the input signal prior to receipt by said input means.

6. The apparatus of claim 5, wherein said means for storage is a tape recorder.

7. The apparatus of claim 6, further comprising means for compensation of the stored input signal for variation in the speed of said tape recorder.

8. The apparatus of claim 7, wherein said means for compensation comprise a local oscillator for generating a signal, means for varying said local oscillator signal mixed with said input signal within said translation means, prior to selecting out the real and imaginary components, in accordance with variation in the speed of said tape recorder.

9. The apparatus of claim 1, wherein said low-pass filter means comprises at least two digital filters for selecting out the real and imaginary components of each of said translated signals.

10. The apparatus of claim 9, wherein each of said digital filters comprises a series of multipliers, in which a sample of the input signal is multiplied by filter coefficients, and means for summing the results of said multiplications to generate an output sample.

11. The apparatus of claim 10, wherein said filter coefficients are stored in random access memory means and are supplied to said multipliers for multiplying each of the samples.

12. The apparatus of claim 11, wherein said random access memory means is addressed by a first pointer which is incremented in successive steps to address successive ones of said filter coefficients.

13. The apparatus of claim 12, wherein said sample of the input signal is stored in further random access memory means and is supplied to said multipliers for multiplication by said filter coefficients.

14. The apparatus of claim 13, wherein said further random access memory means are addressed by a second pointer which is incremented after each multiplication step.

15. The apparatus of claim 14, wherein during an initialization mode undergone upon selection of subcarrier channels of data to be demodulated by an operator said first and second pointers are initialized under control of a mircroprocessor not used in subsequent operation in a run mode during which said multiplying and summing steps are performed and said pointers are employed to access said random access memory means and said further random access memory means.

16. A method for demodulating a frequency-division multiplexed input signal having one or more subcarrier channels with modulation frequencies, comprising the steps of:
sampling said input signal at regular intervals,
multiplying successive samples by real and imaginary components of complex-plane vectors representing local oscillator signals of frequencies corresponding to the center frequencies of the subcarrier channels of said input signal,
storing values thus obtained from said multiplying of said successive samples in random access memory means,
successively supplying low-pass filter coefficients chosen corresponding to the modulation frequencies of the subcarrier channels of the input signal to a low pass filter multiplier means,
successively supplying said successive samples of the translated signals to the low pass filter multiplier means,
multiplying the samples by said low-pass filter coefficients in the low-pass filter multiplier means,
summing the results of the multiplication from said low pass filter multiplier means by said low pass filter coefficients to generate a complex one-word output value,
incrementing pointer means used to generate addresses of retrieval of the sample values from the random access memory means, and
demodulating the translated signals by analysis of vectors in the complex plane represented by the complex one-word output values.

17. The method of claim 16 further comprising the steps of adding additional samples of the translated signal to those stored in the random access memory means and removing individual samples from the random access memory means after the individual samples have been multiplied by the low-pass filter coefficients in accordance with the subcarrier channels of said input signal.

18. The method of claim 16 further comprising the step of writing a plurality of sets of low-pass filter coefficients corresponding to a like plurality of available input signal frequency subcarrier channels to further random access memory means in response to subcarrier channel selection by an operator in an initialization step, and subsequently supplying said low-pass filter coefficients to said low-pass filter multiplier means for multiplication by said samples.

19. The apparatus of claim 14 wherein said second pointer is incremented to provide addresses for retrieving said low-pass filter coefficients from said further random access memory means.

20. The method of claim 16 wherein the step of demodulating the input signals by analysis of vectors in the complex plane represented by the output values is performed by measuring the phase of the translated signal as represented by the angle of the complex plane vector to the real axis.

21. The method of claim 20 wherein said angle is measured by employing a successive approximation technique.

22. The method of claim 21 wherein said successive approximation technique employs the Cordic algorith.

23. The method of claim 20 wherein frequency modulation of the input signal is recovered by measuring the time rate of change of the phase of the vector in the complex plane.

24. A method of operation of a demodulator for demodulating a frequency division multiplexed input signal, said demodulator comprising digital filters for multiplying samples of the input signal by coefficients to separate out subcarrier channels of information from the input signal, wherein said demodulator is operated in an initialization mode and a run mode,
wherein said initialization mode comprises performance of the following steps:
accepting operator input to define the subcarrier channels of information to be demodulated from the input signal;
supplying low pass filter coefficients corresponding to subcarrier channels to be demodulated to first random access memory means;
initializing a first pointer register means containing a pointer used to address said first random access memory means to retrieve said low-pass filter coefficients therefrom; and
initializing a second pointer register means containing a pointer used to address a second random access memory means adapted to store said samples of said input signal; and
wherein said run mode comprises the steps of:
employing said pointer register means to address said random access memory means, to retrieve said low-pass filter coefficients and corresponding samples;
multiplying said retrieved low-pass filter coefficients by said retrieved samples in low-pass filter multiplier means;
summing the results of said multiplications to generate a complex one-word output signal value;
incrementing said pointer to access the next set of low-pass filter coefficients and next set of sample values to be multiplied to generate the next complex one-word output signal value; and
demodulating the original input signal.

25. The method of claim 24 wherein microprocessor means performs said steps of supplying said low-pass filter coefficients to said random access memory means and initializing of said first and second pointer register means during operation in said initialization mode, but does not control operation of said demodulator in said run mode.

26. The method of claim 24 wherein said run mode further comprises the steps of storing additional samples of said input signal in said random access memory means when received, and deleting samples from said random access memory means after said samples in said random access memory means have been multiplied by each of the low-pass filter coefficients corresponding to each of the subcarrier channels.

27. The method of claim 24 wherein said run mode comprises the additional step of multiplying the input signals by real and imaginary signals corresponding to the phase of a local oscillator signal at the center frequency of the subcarrier channels in the input signal, whereby the information in the input signal is represented by a vector in the complex plane.

28. The method of claim 27 comprising the further step of recovering the information in the input signal by analyzing the angle of said vector in the complex plane.

29. The method of claim 28 wherein information in the input signal is recovered by measuring the angle of said vector with respect to the real axis in the complex plane.

30. The method of claim 29 wherein said angle of said vector is measured by a successive approximation technique.

31. The method of claim 30 wherein frequency information in the input signal is recovered by analysis of the time rate of change of the phase of the complex one-word output signal.

32. The method of claim 27 comprising the further step of storing the input signal prior to sampling.

33. The method of claim 28 wherein said input signal is stored on tape drive means and comprising the further step of compensating said signal for variation in the speed of said tape drive means.

34. The method of claim 33 wherein said compensating step is effected by comparing the nominal frequency signal stored together with said input signal to a fixed reference frequency, and correcting the local oscillator signal frequencies accordingly.

* * * * *